(12) United States Patent
Naganuma et al.

(10) Patent No.: US 7,423,823 B2
(45) Date of Patent: Sep. 9, 2008

(54) LENS BARREL

(75) Inventors: Jun Naganuma, Ibaraki (JP); Atsushi Fuseya, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/886,241

(22) Filed: Jul. 7, 2004

(65) Prior Publication Data

US 2005/0007680 A1    Jan. 13, 2005

(30) Foreign Application Priority Data

Jul. 8, 2003    (JP) ............................. 2003-271754
Jul. 31, 2003   (JP) ............................. 2003-283796

(51) Int. Cl.
  *G02B 7/02*    (2006.01)
  *G02B 15/14*   (2006.01)
(52) U.S. Cl. ....................... 359/820; 359/819; 359/826; 359/704
(58) Field of Classification Search ................ 359/820, 359/819, 704, 703, 811, 826, 701, 709; 353/100, 353/101; 362/455
  See application file for complete search history.

(56) References Cited

U.S. PATENT DOCUMENTS

| 4,710,004 A | 12/1987 | Verhaagen |
| 4,805,991 A * | 2/1989 | Arai et al. .................... 359/824 |
| 5,537,249 A | 7/1996 | Masunaga et al. |
| 5,537,250 A | 7/1996 | Masunaga et al. |
| 6,434,331 B1 | 8/2002 | Araoka et al. |
| 6,550,986 B2 * | 4/2003 | Naganuma ................... 396/463 |
| 2002/0136554 A1 | 9/2002 | Nomura et al. |
| 2002/0149859 A1 | 10/2002 | Muto et al. |
| 2005/0119441 A1* | 6/2005 | Ikeda et al. .................. 528/196 |

FOREIGN PATENT DOCUMENTS

| JP | 08-198611 | 8/1996 |
| JP | 2000-109659 | 4/2000 |
| JP | 2001-237133 | 8/2001 |
| JP | 2002-348741 | 12/2002 |
| TW | 468088 | 12/2001 |
| TW | 470863 | 1/2002 |
| TW | 498021 | 8/2002 |
| TW | 500745 | 9/2002 |
| TW | 524824 | 3/2003 |
| TW | 238361 | 8/2005 |

* cited by examiner

*Primary Examiner*—Scott J. Sugarman
*Assistant Examiner*—Brandi N Thomas
(74) *Attorney, Agent, or Firm*—Cowan, Liebowitz & Latman, P.C.

(57) ABSTRACT

A lens barrel component includes a lens holding member for holding a lens and a supporting member supporting the lens holding member. The lens barrel component is molded using a composite material containing at least clay and a thermoplastic resin.

6 Claims, 5 Drawing Sheets

COMPONENT A
COMPONENT B (1) START CORONA DISCHARGE

DISCHARGE ELECTRODE
SPECIMEN
STAGE
GROUNDED (2) ACCUMULATION AND LEAKAGE OF ELECTRIC CHARGE (3) STOP CORONA DISCHARGE (4) MEASURE SURFACE POTENTIAL

SURFACE POTENTIOMETER PROBE

LENS BARREL

This application claims priority from Japanese Patent Application Nos. 2003-271754 filed on Jul. 8, 2003 and 2003-283796 filed on Jul. 31, 2003, which are hereby incorporated by reference.

BACKGROUND OF THE INVENTION

1. Field of the Invention

The present invention relates to an improvement of a lens barrel provided in an optical instrument such as a camera and having conductivity and antistatic properties for preventing electronic circuit failure inside the instrument and instrument malfunction caused by charging.

2. Related Background Art

A lens barrel is generally formed by molding a plastic resin from a viewpoint of miniaturization, weight saving, and thickness reduction. Further, a lens barrel main body needs to have conductivity for preventing instrument failure caused by external charging. That is, a solution is adopted in which a carbon fiber as a conductive material is mixed with a resin material used for the lens barrel, to thereby impart the conductivity to the lens barrel main body and to release charge to the lens barrel. Examples of the instrument failure include malfunction (such as image distortion) caused by falling of external stored charges to a terminal connected to an electrical circuit inside a digital camera. However, the mixing of the carbon fiber causes problems such as significant reduction in moldability (fluidity) of the resin material, increase in abrasion of a metal mold involved in deterioration of the fluidity, and huge cost for mold correction. The mixing of the carbon fiber also leads to weight increase of the lens barrel, thereby basically inhibiting miniaturization, weight saving, and thickness reduction.

Further, a resin composition having higher conductivity has been proposed recently, which is prepared by mixing a conductive material represented by the carbon fiber or the like with a resin. Examples of mixing methods include: a method of increasing a mixing amount of the conductive material such as a carbon fiber; and a method of combining a plurality of conductive materials. Increasing the mixing amount of the conductive material provides high conductivity, but also causes problems in deterioration of moldability (fluidity) of the material and reduction of mechanical properties such as impact strength. On the other hand, examples of the method of increasing conductivity by combining a plurality of conductive materials include a technique of combining a carbon fiber with carbon black. The combining improves the conductivity, but does not provide sufficient moldability (fluidity) or mechanical properties.

As described above, a resin material having excellent moldability or the like is hardly obtained unless a carbon fiber content is reduced or the carbon fiber is eliminated. In other words, combination of the conductivity and the moldability is difficult.

The mixing of the carbon fiber with the resin material to impart conductivity described above, as a solution to instrument failure, causes problems such as significant reduction in moldability (fluidity or the like during molding) of the resin material, increase in abrasion of the metal mold involved in deterioration of the fluidity, and huge cost for mold correction. The mixing also leads to weight increase of the lens barrel.

Thus, the mixing of the carbon fiber is far from the best method for miniaturization, weight saving, thickness reduction, and cost reduction. That is, it has been desired to impart conductivity by eliminating or reducing use of the carbon fiber conventionally used, without losing the moldability, and using a replacement of the carbon fiber causing small mold abrasion.

Further, a resin containing a glass fiber or a carbon fiber has poor fluidity, and thus, has problems such as difficulties in reducing the thickness of lens barrel components and in providing given rigidity when the content of the glass fiber or the carbon fiber is reduced to enhance the fluidity.

Further, the glass fiber or the carbon fiber orients owing to a resin flow, causing anisotropy in shrink ratio of the resin. Thus, high dimension accuracy was also hardly obtained in the lens barrel components.

Further, the glass fiber or the carbon fiber abrades a metal mold during molding and shortens the life of the metal mold. For example, the lens barrel components constituting a zoom lens barrel unit are provided with a fitting portion requiring high precision. Thus, the metal molds of all components must be produced again when any of the metal molds is abraded in the various lens barrel components constituting the lens barrel unit. Thus, the cost of the metal molds also becomes a concern.

SUMMARY OF THE INVENTION

The present invention has been made in consideration of the above situation, and its object is to provide a thin-walled lens barrel having excellent conductivity and antistatic properties by molding the lens barrel with a conductive resin composition containing a carbon nanotube and/or a vapor grown carbon fiber.

Another object of the present invention is to provide a lens barrel component having satisfactory thin-wall moldability, high rigidity, and excellent dimension accuracy, and capable of reducing metal mold abrasion during molding.

According to an aspect of the present invention, the foregoing object is attained by providing a lens barrel molded using a conductive resin composition including at least the following components [A] and [B] in a lens barrel main body.

Component [A]: at Least one of Carbon Nanotube and Vapor Grown Carbon Fiber

Component [B]: Resin

According to another aspect of the present invention, the foregoing object is also attained by providing a lens barrel component including a lens holding member holding a lens and a supporting member supporting the lens holding member, the lens barrel component being molded using a composite material containing at least the following components A and B.

Component A: Clay

Component B: Thermoplastic Resin

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

First Embodiment

A lens barrel described below is molded using a conductive resin composition containing at least the following components [A] and [B].

Figure 1:
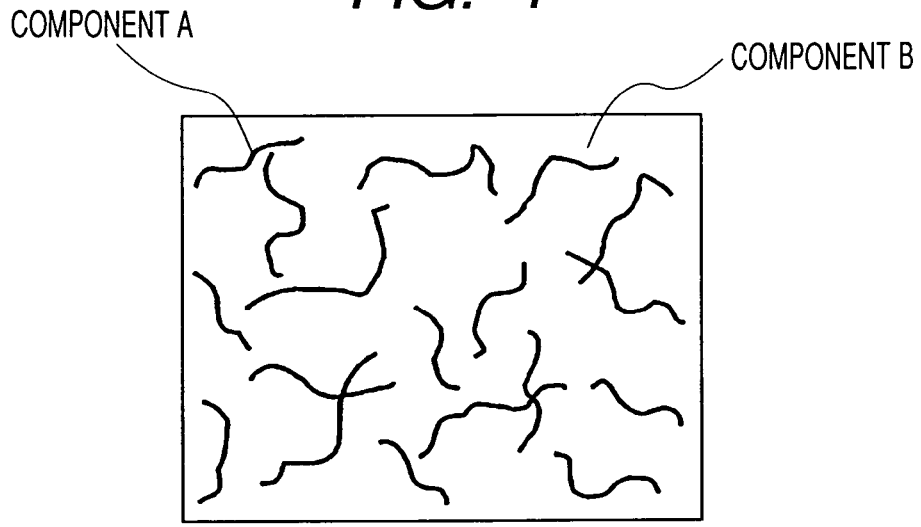
FIG. 1 is a schematic diagram of a resin composition of a lens barrel according to examples of the present invention.
Figure 2A:
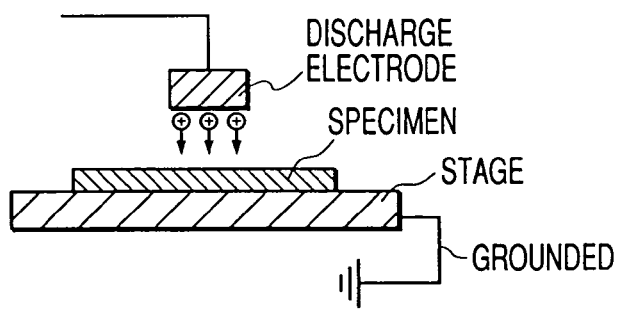
FIGS. 2A, 2B, 2C and 2D are schematic diagrams illustrating an evaluation method for antistatic properties of a lens barrel according to examples of the present invention.
Figure 2B:
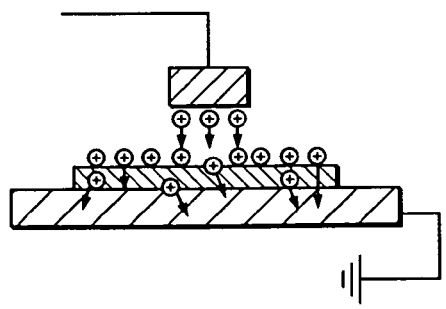
Figure 2C:
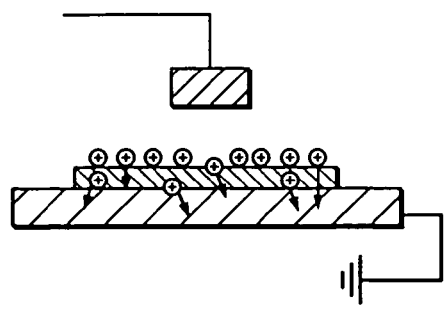
Figure 2D:
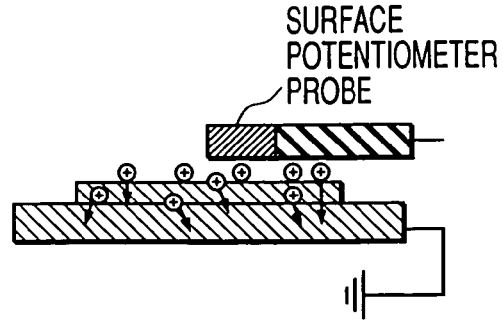

Component [A]: Carbon Nanotube and Vapor Grown Carbon Fiber
Component [B]: Resin FIG. 1 shows a schematic diagram of the resin composition of the lens barrel.

The component [A] is a carbon nanotube and/or a vapor grown carbon fiber. The carbon nanotube as used herein refers to a single-walled nanotube or a multi-walled nanotube formed through a vapor growth method, an arc discharge method, a laser vaporization method, or the like. The vapor grown carbon fiber as used herein refers to a discontinuous carbon fiber or graphite fiber obtained by growing a crystal in a vapor phase through the vapor growth method. The nanotube may be in an arbitrary form of a needle, a coil, a tube, a cup, or the like. Further, the nanotube may contain two or more types of the nanotube forms blended. A production method for the component [A] is not particularly limited and may include any of the methods described above or other methods. Examples thereof include methods disclosed in Japanese Patent Application Laid-Open No. H08-198611 and Japanese Patent Application Laid-Open No. 2002-348741.

The component [A] preferably has an average single fiber diameter within the range of 1 to 200 nm. An average single fiber diameter of less than 1 nm may pose difficulties in production of a fiber. On the other hand, an average single fiber diameter exceeding 200 nm may inhibit the desired conductivity. The component [A] has an average single fiber diameter within the range of more preferably 1 to 150 nm, even more preferably 1 to 100 nm, and most preferably 1 to 50 nm.

Any one of a thermosetting resin and a thermoplastic resin can be used for the component [B].

Examples of the thermosetting resin include an epoxy resin, a phenol resin (resole type, novolac type), an unsaturated polyester resin, a vinyl ester resin, an alkyd resin, an acrylic resin, a guanamine resin, a diallyl phthalate resin, an allyl ester resin, a furan resin, an imide resin, a urethane resin, a urea resin, a melanin resin, a xylene resin, and a polyimide resin. A copolymer or modified product thereof can also be used. A resin containing two or more types thereof blended can also be used.

Examples of the thermoplastic resin include: polyolefin or styrene-based resins such as an acrylonitrile butadiene styrene (ABS) resin, a polyamide (PA) resin, a polyamidimide (PAI) resin, a polyallylate (PAR) resin, a polycarbonate (PC) resin, a polybutylene terephthalate (PBT) resin, a polyethylene (PE) resin, a polyetheretherketone (PEEK) resin, a polyetherimide (PEI) resin, a polyetherketone (PEK) resin, a polyetherketoneketone (PEKK) resin, a polyethylene naphthalate (PEN) resin, a polyethernitrile (PEN) resin, a polyethersulfone (PES) resin, a polyethylene terephthalate (PET) resin, a polyimide (PI) resin, a polyketone (PK) resin, a polymethylene methacrylate (PMMA) resin, polytrimethylene terephthalate (PTT) resin, a polyester (such as liquid crystal polyester) resin, a polyoxymethylene (POM) resin, a polypropylene (PP) resin, a polyphenylene ether (PPE) resin, a polyphenylene sulfide (PPS) resin, a polysulfone (PSU) resin, a polyvinyl chloride (PVC) resin, and a polybutylene resin; phenol resins (such as novolac type) and phenoxy resins; fluorine-based resins such as a polytetrafluoroethylene resin; and thermoplastic elastomers such as a polystyrene-based elastomer, a polyolefin-based elastomer, a polyurethane-based elastomer, a polyester-based elastomer, a polyamide-based elastomer, a polybutadiene-based elastomer, a polyisoprene-based elastomer, and a fluorine-based elastomer. A copolymer or modified product thereof can also be used. A resin containing two or more types thereof alloyed or blended can also be used.

Further, other elastomers or rubber components may be added to the thermoplastic resin and the thermosetting resin for improving impact resistance.

Examples of a more preferable resin include at least one type of thermoplastic resin selected from the group consisting of a polycarbonate (PC) resin, a polyphenylene sulfide (PPS) resin, an acrylonitrile butadiene styrene (ABS) resin, a polybutylene terephthalate (PBT) resin, a polyethylene terephthalate (PET) resin, a polystyrene (PS) resin, a polyphenylene ether (PPE) resin, a polyamide (PA) resin, a liquid crystal polymer (LCP) resin, a polyolefin resin, and an alloy resin combining the above resins such as PC/ABS or PC/PS. Further, the lens barrel main body has a surface resistivity of $1 \times 10^6$ Ω/sq or more and $1 \times 10^{13}$ Ω/sq or less.

The conductive resin composition may further contain the following additives depending on the purpose as a component [C] according to the present invention. Examples of the additives include: fillers (such as silica, silicone, modified silicone oil, sericite, sepiolite, glass flakes, glass microballoons, glass beads, graphite, xonotlite, wollastonite, potassium titanate whiskers, aluminum borate whiskers, calcium borate, zinc borate, calcium polyphosphate, antimony oxide, titanium oxide, zinc oxide, calcium carbonate, molybdenum disulfide, magnesium sulfate, barium sulfate, and polymers); conductivity imparting agents (such as metal-based agents and metal oxide-based agents); flame retardants (such as halogen-based flame retardants (such as a bromide resin), antimony-based flame retardants (such as antimony trioxide and antimony pentoxide), phosphorus-based flame retardants, metal organic acid salt-based flame retardants (such as metal organic borate, metal carboxylate, and metal aromatic sulfonimide), inorganic flame retardants (such as zinc, zinc oxide, and zirconium compound), nitrogen-based flame retardants (such as cyanuric acid, isocyanuric acid, melamine, melamine cyanurate, melamine phosphate, and nitrogenized guanidine), fluorine-based flame retardants (such as PTFE), silicone-based flame retardants (such as silicone oil, modified silicone oil, and polyorganosiloxane), and metal hydroxide-based flame retardants (such as aluminum hydroxide and magnesium hydroxide)); flame retardant auxiliaries (such as cadmium oxide, zinc oxide, cuprous oxide, cupric oxide, ferrous oxide, ferric oxide, cobalt oxide, manganese oxide, molybdenum oxide, tin oxide, and titanium oxide); pigments; dyes; lubricants (such as silicone oil and modified silicone oil); release agents; compatibilizers; dispersants (such as silicone oil and modified silicone oil); nucleators; plasticizers (such as phosphate); heat stabilizers; antioxidants; color protection agents; UV absorbers; fluidity modifiers; foaming agents; antibacterial agents; vibration dampers; deodorants; sleeve modifiers; and antistatic agents (such as polyetheresteramide). Further, each of the additives may be used alone or a mixture of two or more types thereof may be blended before use.

The lens barrel according to the present invention is molded through injection molding. Examples of a form of the conductive resin composition used for molding include pellets, stampable sheets, prepreg, SMC, and BMC. The pellets are most desirable. The pellets of the conductive resin composition are prepared by: melt kneading a desired amount of the resin with the carbon nanotube and the vapor grown carbon fiber; extruding the kneaded product; and pelletizing the extruded product. The pellets may include long fiber pellets. The long fiber pellets refer to pellets, as described in Japanese Patent Publication No. S63-037694, having long fibers arranged substantially parallel in a longitudinal direction of the pellets and having the fibers with a length equal to or longer than those of the pellets. Further, examples of devices for melt kneading the conductive resin composition include Banbury mixer, rolls, Brabender, a single screw extruder, a twin screw extruder, and a kneader. The twin screw extruder is most desirable.

Hereinafter, the present invention will be described in more detail by way of examples.

A lens barrel (diameter 30 mm×length 20 mm×average thickness 0.6 mm) was produced using the components of the present invention for the evaluation. The thickness limit of a lens barrel (lens barrel main body) was conventionally about 1.0 mm, but a lens barrel can be molded to a thickness of 0.6 mm as described above, by molding the lens barrel with the conductive resin composition containing a carbon nanotube and/or a vapor grown carbon fiber. According to the present invention, a lens barrel having an average thickness of even 1.00 mm or less can be molded. Evaluation items and evaluation methods for the lens barrel will be described below.

1. Surface Resistivity

Surface resistivity as used herein is an index of resistance per unit area of a sample surface and can be measured using a 4-terminal 4-probe method following JIS-K7149. The 4-terminal 4-probe method involves: passing a current from outer 2 probes of 4 probes aligned at regular intervals; and calculating the resistivity using the inner two probes. A low resistivity meter (Loresta GP Model MCP-T600, measurement range: $10^{-3}$ to $10^7$ Ω, manufactured by Mitsubishi Chemical Corporation) was used. 10 samples were measured in this measurement, and the average value of the samples was defined as the surface resistivity.

2. Charge Potential

Charge potential as used herein refers to charge amount present on the sample surface, and directly indicates the antistatic properties of the sample. The measurement method involves: placing the lens barrel on a grounded stage; charging (0.1 μA×2 s=0.2 μC) the lens barrel through corona discharge; accumulating the charge on the surface of the lens barrel; and measuring the charge amount at 5 s after stopping the discharge using a surface potentiometer (Coronasurf, manufactured by TS Nanocoat). 10 samples were measured in this measurement, and the average value of the samples was defined as the charge potential. The measurement method is described in FIGS. 2A to 2D.

3. Maximum Filling Pressure

Maximum filling pressure as used herein refers to the maximum pressure of the resin when the resin is filled in the cavity during injection molding, and is one factor for evaluating resin fluidity. That is, the moldability of resin materials can be compared using the maximum filling pressure as a comparison item. A molding machine (SG50, screw diameter: Φ22, manufactured by Sumitomo Heavy Industries, Ltd.) was used.

4. Mold Material Abrasion Loss

Mold material abrasion loss as used herein is measured by: using aluminum (A1050P), which is more brittle, for a part of a metal mold cavity employing S55C as a mold material; and molding 10,000 shots using the respective materials, and represents the abrasion loss in weight.

Types and notations of the respective components used in Examples of the present invention will be described below.

Component [A]

NT1: vapor grown multi-walled nanotube MWNT (average single fiber diameter=about 10 nm, available from Hyperion Catalysis International Inc.)

NT2: vapor grown multi-walled nanotube VGNF (average single fiber diameter=about 80 nm, available from Showa Denko K. K.)

NT3: vapor grown multi-walled nanotube VGCF (average single fiber diameter=about 150 nm, available from Showa Denko K. K.)

Component [B]

PC: polycarbonate resin (LEXAN 121R-111, available from GE Plastics Japan, Ltd.)

PPS: polyphenylene sulfide resin (LR-1G, available from Dainippon Ink and Chemicals, Inc.)

Component [C]

SI: modified silicone oil (BY16-799, available from Dow Corning Toray Silicone Co., Ltd.)

TI: potassium titanate fiber (TISMO D, available from Otsuka Chemical Co., Ltd.)

EXAMPLES 1, 2, 8, and 9

Desired amounts of sufficiently dried masterbatch containing 15 wt % component [A] (base resin: LEXAN 131-111, available from GE Plastics Japan, Ltd.; and available from Hyperion Catalysis International Inc.) and component [B] were dry blended, charged from a main hopper of a twin screw extruder, and extruded in a sufficiently melt and kneaded form. Strands were cooled and then formed into pellets using a pelletizer. The obtained pellets were molded into a lens barrel (diameter 30 mm×length 20 mm×average thickness 0.6 mm) using a molding machine (SG50, screw diameter: Φ22, manufactured by Sumitomo Heavy Industries, Ltd.). The molding conditions include: a metal mold temperature of 125° C., an injection speed of 80 mm/s, a nozzle set temperature of 315° C., and a hold pressure of 102 MPa.

EXAMPLES 3 and 4

The desired amount of the sufficiently dried component [B] was charged from a main hopper of a twin screw extruder, and extruded in a sufficiently melt and kneaded form while the component [A] was charged from a side feeder for impregnation of the resin in nanotubes and extrusion. The extruded strands were cooled, and then formed into pellets using a pelletizer. The obtained pellets were molded into a lens barrel (diameter 30 mm×length 20 mm×average thickness 0.6 mm) using a molding machine (SG50, screw diameter: Φ22, manufactured by Sumitomo Heavy Industries, Ltd.). The molding conditions include: a metal mold temperature of 125° C., an injection speed of 80 mm/s, a nozzle set temperature of 315° C., and a hold pressure of 102 MPa.

EXAMPLES 5 and 6

In addition to the procedures in Examples 1, 2, 8, and 9, the desired amount of the component [C] was charged from the side feeder while the components [A] and [B] were extruded in a sufficiently melt and kneaded form.

EXAMPLE 7

Desired amounts of sufficiently dried masterbatch containing 15 wt % component [A] (base resin: FORTRON 0214, available from Ticona; and available from Hyperion Catalysis International Inc.) and component [B] were dry blended, charged from a main hopper of a twin screw extruder, and extruded in a sufficiently melt and kneaded form. Strands were cooled and then formed into pellets using a pelletizer. The obtained pellets were molded into a lens barrel (diameter 30 mm×length 20 mm×average thickness 0.6 mm) using a molding machine (SG50, screw diameter: Φ22, manufactured by Sumitomo Heavy Industries, Ltd.). The molding conditions include: a metal mold temperature of 115° C., an injection speed of 80 mm/s, a nozzle set temperature of 325° C., and a hold pressure of 102 MPa.

COMPARATIVE EXAMPLE 1

A lens barrel (diameter 30 mm×length 20 mm×average thickness 0.6 mm) was molded using a resin containing 20 wt % carbon fiber (Panlite B7730R, available from Teijin Chemicals, Ltd.) and a molding machine (SG50, screw diameter: Φ22, manufactured by Sumitomo Heavy Industries, Ltd.). The molding conditions include: a metal mold temperature of 135° C., an injection speed of 100 mm/s, a nozzle set temperature of 325° C., and a hold pressure of 71 MPa.

COMPARATIVE EXAMPLE 2

A lens barrel (diameter 30 mm×length 20 mm×average thickness 0.6 mm) was molded using a resin containing 10 wt % carbon fiber (Panlite B7110R, available from Teijin Chemicals, Ltd.) and a molding machine (SG50, screw diameter: Φ22, manufactured by Sumitomo Heavy Industries, Ltd.). The molding conditions include: a metal mold temperature of 135° C., an injection speed of 100 mm/s, a nozzle set temperature of 325° C., and a hold pressure of 71 MPa. Table 1 shows the results.

TABLE 1

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Resin composition (wt %) | | | | | | | | | | | |
| Component [A] | | | | | | | | | | | |
| NT1 | 5 | 3.5 | — | — | 5 | 5 | 5 | 0.5 | 20 | — | — |
| NT2 | — | — | 5 | — | — | — | — | — | — | — | — |
| NT3 | — | — | — | 5 | — | — | — | — | — | — | — |
| Component [B] | | | | | | | | | | | |
| PC | 95 | 96.5 | 95 | 95 | 90 | 90 | — | 99.5 | 80 | 70 | 90 |
| PPS | — | — | — | — | — | — | 95 | — | — | — | — |
| Component [C] | | | | | | | | | | | |
| SI | — | — | — | — | 5 | — | — | — | — | — | — |
| TI | — | — | — | — | — | 5 | — | — | — | — | — |
| Carbon fiber CF | — | — | — | — | — | — | — | — | — | 20 | 10 |
| Glass fiber GF | — | — | — | — | — | — | — | — | — | 10 | — |
| Properties of component [A] and CF | | | | | | | | | | | |
| Average fiber | 10 | 10 | 80 | 150 | 10 | 10 | 10 | 10 | 10 | 7,000 | 7,000 |

TABLE 1-continued

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| diameter (nm) | | | | | | | | | | | |
| Properties of lens barrel | | | | | | | | | | | |
| Surface resistivity ($\Omega$/sq) | $7 \times 10^4$ | $3 \times 10^6$ | $2 \times 10^8$ | $2 \times 10^9$ | $2 \times 10^3$ | $3 \times 10^4$ | $9 \times 10^4$ | $7 \times 10^{12}$ | $9 \times 10^0$ | $8 \times 10^1$ | $2 \times 10^8$ |
| Charge potential (mV) | 255 | 511 | 761 | 887 | 167 | 238 | 299 | 1,150 | 75 | 8,964 | not measurable |
| Maximum filling pressure (MPa) | 135 | 126 | 148 | 155 | 125 | 126 | 91 | 105 | 170 | 285 | 210 |
| Mold abrasion loss (mg) | 2.03 | 1.87 | 2.28 | 2.49 | 1.92 | 1.95 | 1.98 | 1.76 | 2.53 | 5.90 | 3.58 |

The results of Table 1 compare the lens barrels produced using the conductive resin compositions each containing the carbon nanotube and/or the vapor grown carbon fiber (hereinafter, referred to as CNT lens barrels) and the conventional lens barrels (hereinafter, referred to as CF lens barrel).

1. Surface Resistivity/Charge Potential

Regarding the surface resistivity, the CF lens barrels of Comparative Examples 1 and 2 exhibit lower values, but regarding the charge potential, the CNT lens barrels of Examples 1 to 7 exhibit lower values. The difference supposedly results from a difference in states of conductive network formation caused by a difference in diameter or shape of the respective CF and CNT lens barrels. For evaluation of the antistatic properties, which is a main purpose of the present invention, actual charge amounts should be compared. That is, the charge potentials should be compared, and the CNT lens barrels exhibit better values.

2. Content

Sufficient antistatic properties are, exhibited with 10 to 20 wt % carbon nanotube in the CF lens barrels while the CNT lens barrels require mere 3.5 wt % carbon nanotube. Thus, the CNT lens barrels are better than the CF lens barrels in view of weight saving and cost reduction owing to content reduction.

3. Maximum Filling Pressure

Regarding the maximum filling pressure, the CNT lens barrels exhibit lower values. That is, the CNT lens barrels exhibit better moldability and fluidity. The CNT lens barrels can be produced at 35 to 55% the pressure required for the CF lens barrel. That is, the CNT lens barrels are better than the CF lens barrels in reduction of mold material abrasion and thin-wall moldability, which are perceived as problems.

4. Mold Material Abrasion Loss

Regarding the mold material abrasion loss, a material having high maximum filling pressure and poor fluidity has high mold material abrasion loss. An obvious difference exists between the materials respectively containing CNT and CF.

As described above, the lens barrel having excellent conductivity, antistatic properties, and moldability (fluidity) compared with the conventional lens barrel can be obtained by using the carbon nanotube and/or the vapor grown carbon fiber. Further, the metal mold of the present invention is subjected to less abrasion because of excellent fluidity and huge cost is not required for mold modification unlike the prior art, thereby providing an excellent lens barrel costwise as well.

Figure 3:
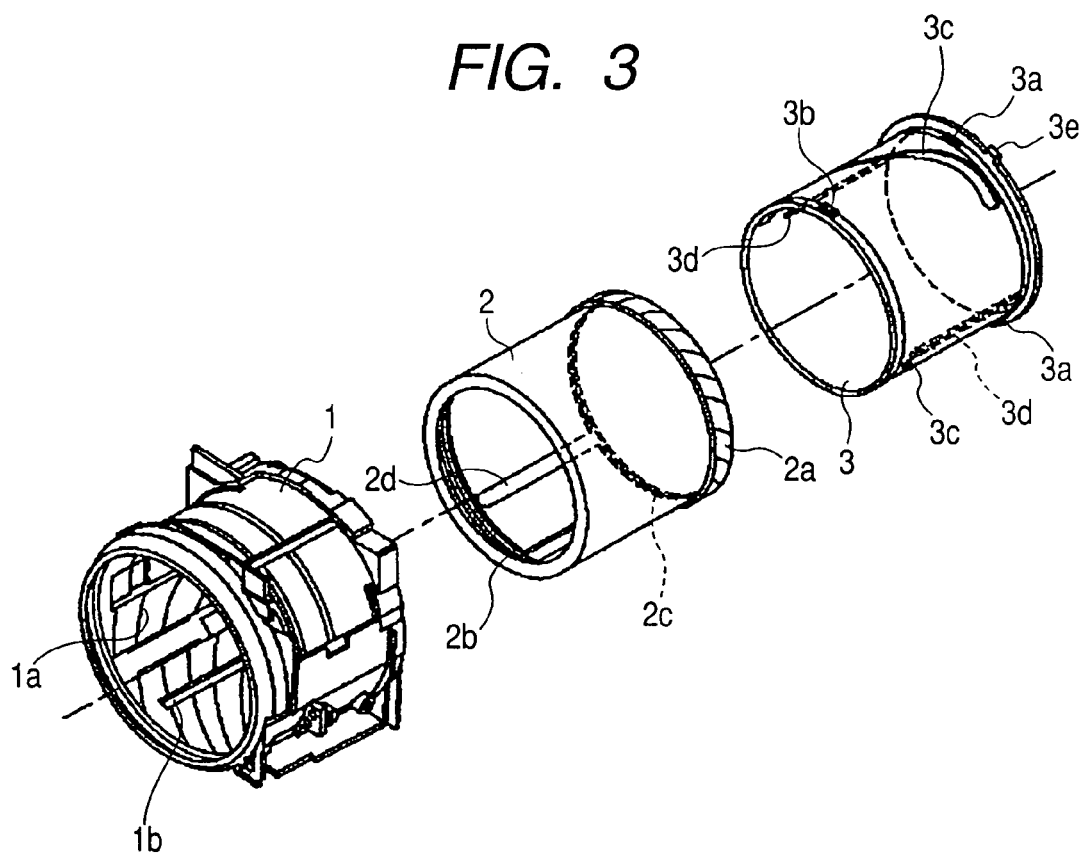
FIG. 3 is an exploded perspective view showing components of a part of a camera lens barrel provided with a zoom function according to the present invention.
Figure 4:
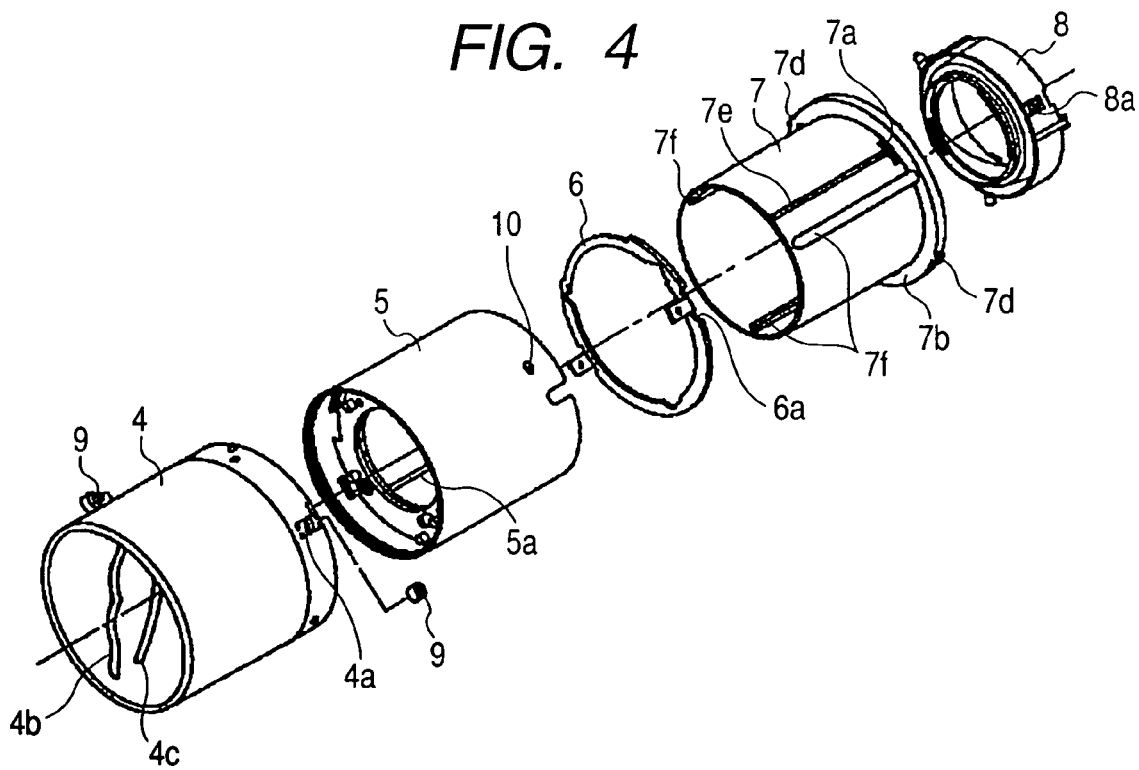
FIG. 4 is an exploded perspective view showing components of a part of a camera lens barrel provided with a zoom function according to the present invention.

Next, FIGS. 3 and 4 each show an example of a lens barrel produced using the conductive resin composition containing the carbon nanotube and/or the vapor grown carbon fiber.

FIGS. 3 and 4 each show a camera lens barrel of examples according to the present invention. To be specific, FIG. 3 is a exploded perspective view showing components of a part of the lens barrel, and FIG. 4 is a perspective view showing other components of the lens barrel. The structure of the lens barrel will be described with reference to FIGS. 3 and 4.

In FIG. 3, formed in the inner periphery of the stationary cylinder 1 accommodating the entire zoom lens lens-barrel unit are a female helicoid 1a and two linear grooves 1b, with the stationary cylinder being mounted to a camera main body (not shown). A drive cylinder 2 is arranged inside the stationary cylinder 1; formed on the image formation plane side of its outer periphery is a spur gear helicoid 2a consisting of a male helicoid and a spur gear that are formed integrally with each other, and the spur gear helicoid 2a is helicoid-connected with the female helicoid 1a of the stationary cylinder; formed on the image formation plane side and subject side (the left-hand side in FIG. 3) of its inner periphery respectively are rotary guide grooves 2b and 2c extending in the circumferential direction and two drive grooves 2d extending in the optical axis direction. Arranged inside the drive cylinder 2 is a first straight-advancement guide cylinder 3; formed in the inner surface thereof are two linear grooves 3d, and protrusions 3a and 3b are respectively implanted on the image formation plane side and the subject side (the left-hand side in FIG. 3) of the outer surface thereof; further, there are formed two through-cam-holes 3c; by fitting the plurality of protrusions 3a and 3b into the rotary guide grooves 2b and 2c, the drive cylinder 2 is held so as to be freely rotatable and capable of moving integrally in the optical axis direction with respect to the straight-advancement guide cylinder 3. Further, a protrusion 3e provided on the image formation plane side of the outer periphery thereof is fit into the linear groove 1b of the stationary cylinder 1, and is connected so as to be capable of freely shifting in the optical axis direction but regulated in its rotation.

In FIG. 4, arranged inside the first straight-advancement guide cylinder 3 is a cam cylinder 4, and provided in the inner surface thereof are three cam grooves 4b and three cam grooves 4c for the driving of first and second unit lenses described below and two through-holes 4a. A first unit cylinder 5 is arranged inside the cam cylinder 4, and retains a first unit lens 11 in its interior, with two linear ribs 5a being formed in the inner peripheral portion thereof; three cam pins 10 are implanted in the outer peripheral portion thereof. The cam pins 10 are fit into the cam grooves 4b to drive the first unit lens along the cam track.

Numeral 6 indicates a nut ring; threaded engagement of a drive pin 9 is effected, with hole portions provided in bent portions 6a thereof being mated with the through-holes 4a, thereby integrating the cam cylinder 4, the nut ring 6, and the drive pin 9 with each other. The drive pin 9 is passed through the through-cam-hole 3c to be fit into the drive groove 2d. Further arranged on the inner side of the first unit cylinder 5 is a second straight-advancement guide cylinder 7; formed in the outer periphery are three through-linear-holes 7f and linear grooves 7e; the linear grooves 7e are engaged with the linear ribs 5a, with the second straight-advancement guide cylinder 7 being connected so as to be capable of moving integrally in the rotating direction and moving freely in the optical axis direction with respect to the first unit cylinder 5. Further, formed on the image formation plane side thereof are a flange 7b and a plurality of protrusions 7a, and the nut ring 6 is connected therebetween so as to be freely rotatable but regulated in the optical axis direction. That is, the cam cylinder 4 and the second straight-advancement guide cylinder 7 are connected together so as to be freely rotatable and capable of moving integrally in the optical axis direction. Further, two protrusions 7d formed on the flange 7b are fit into the linear grooves 3d of the first straight-advancement guide cylinder 3 so as to effect a connection allowing free movement in the optical axis direction but regulated in rotation.

Numeral 8 indicates a second unit holding frame for holding a second unit lens 12; a second unit pin 8a is implanted in the outer periphery thereof, the pin being fit into the cam groove 4c to drive the second unit lens 12 along the cam track while being regulated in rotation by the linear grooves 7f.

In the above construction, when a torque is imparted to the spur gear helicoid 2a by a drive gear (not shown), the drive cylinder 102 moves to the left as seen in FIG. 3 while rotating along the helicoid 1a inside the stationary cylinder 1. This rotation is transmitted to the cam cylinder 4 through the drive pin 9, and the cam cylinder 4 also moves to the left as seen in FIG. 3 while rotating along the cam of the through-cam-hole 3c. When the cam cylinder 4 rotates, the first unit cylinder 5 holding the first unit lens 11 and the second unit holding frame 8 holding the second unit lens 12 respectively advance straight to the left as seen in FIG. 3 along the cam grooves 4b and 4c. Through the movement of the first and second unit lenses 11 and 12 in the optical axis direction, scaling operation for the photographing lens is effected, and a so-called zooming operation is achieved; in the above-described lens barrel molded using a conductive resin composition containing a carbon nanotube and a vapor grown carbon fiber, it is possible, as described above, to realize a thin-walled lens barrel, making it possible to maintain a smooth operation when effecting parallel shifting in a plane perpendicular to the optical axis and to achieve a reduction in size.

Second Embodiment (1) A lens barrel component is molded using a composite material containing clay in a thermoplastic resin. The clay is not particularly limited but is generally layered clay mineral having a layer thickness of 7 to 15 Å. Examples of the layered clay mineral include: smectite minerals such as montmorillonite, hectorite, sapolite, stevensite, bidelite, and nontronite; vermulite; halloysite; and mica. Those may be natural or synthetic. Further, each of the layered clay minerals may be used alone, or plural types thereof can be used in combination.

(2) Inorganic ions each having a cation exchange ability and existing between the layers of the clay of a component A are substituted with organic onium ions serving to expand spaces between the layers of the clay. The organic onium ions are organic substances containing onium ions such as an ammonium ion, a pyridinium ion, a phosphonium ion, and a sulfonium ion. The organic onium ions have an alkyl group, a phenyl group, an alkylene group, or the like in the molecule and have a structure of the above-mentioned group bonded through a covalent bond with hydrogen, a hydroxyl group, an amino group, a carboxyl group, a nitro group, a sulfone group, and derivatives thereof. Each of the organic onium ions can be used alone or plural types thereof may be used in combination.

(3) The composite material used for molding the lens barrel component is allowed to contain 1 to 20 wt % clay. A clay content of less than 1 wt % results in small mechanical strength or elasticity, and thus, given rigidity or gas barrier properties required for the lens barrel component may not be provided. On the other hand, a clay content of 20 wt % or more results in poor dispersibility of the clay in the thermoplastic resin, and thus, the lens barrel component may break easily owing to drastic reduction in ductility.

(4) The clay is preferably dispersed as single layers, losing the layered structure, in the thermoplastic resin. That is, intervention of the thermoplastic resin between the layers of the clay increases an interface between the clay and the thermoplastic resin, thereby improving the rigidity of the lens barrel. The interlayer distance is 35 Å, and a single layer or multilayer (5 layers or less) substance is dispersed, accounting for 50% or more, preferably 70% or more of the clay.

(5) Examples of the thermoplastic resin of a component B used include an aromatic polycarbonate-based resin, polyphenylene sulfide, an aromatic polyester-based resin, a polyamide-based resin, and a polyacetal-based resin. Of those, the aromatic polycarbonate-based resin and polyphenylene sulfide are most preferable.

(6) The thermoplastic resin is preferably a modified thermoplastic resin prepared by introducing a functional group on a side chain or main chain of the resin. Preferable examples of the functional group introduced through modification include: functional groups such as an acid anhydride group, a carboxylic acid group, a hydroxyl group, a thiol group, an ester group, an ether group, a thioether group, a sulfonic acid group, a phosphonic acid group, a nitro group, an amino group, an oxazoline group, an amide group, a urea group, a urethane group, an epoxy group, and a halogen group; and aromatic rings such as a benzene ring, a pyridine ring, a thiophene ring, a pyrrole ring, and a furan ring. However, the functional group is not limited thereto. The functional group further improves the dispersibility of the clay in the modified resin, thereby sufficiently providing improved effects by the clays such as moldability, mechanical properties, and gas barrier properties of the lens barrel component.

(7) The composite material used for molding the lens barrel component is allowed to contain a compatibilizer as a component C. The thermoplastic resin and the clay generally have poor affinity to each other, and thus, the clay cannot be dispersed uniformly in the thermoplastic resin. Alternatively, an interaction between the thermoplastic resin and the clay is small. Thus, the expected effects of the clay in the lens barrel component may not be sufficiently exhibited. In the presence of a compatibilizer, compatibility of the clay and the thermoplastic resin having poor affinity to each other improves. Thus, the clay is dispersed uniformly in the thermoplastic resin and the interaction with the thermoplastic resin increases, thereby sufficiently providing improved effects by the clay such as moldability, mechanical properties, and gas barrier properties of the lens barrel component. The compatibilizer refers to a compound having affinity to both the clay and the thermoplastic resin. Specific examples thereof include: lactams such as β-propiolactam, γ-butyrolactam, σ-valerolactam, and ε-caprolactam, and polymers thereof; lactones such as β-propiolactone, γ-butyrolactone, σ-valerolactone, and ε-caprolactone, and polymers thereof; silane coupling agents such as γ-glycidoxypropyltrimethoxysilane and β-ethyltrimethoxysilane; titanate coupling agents such as isopropyl tristearyl titanate and isopropyl tridodecylbenzene sulfonyl titanate; and oligomers of a thermoplastic resin. Each of the compatibilizers can be used alone or plural types thereof may be used in combination.

(8) The content of the compatibilizer used as the component C is 1 to 200 wt % with respect to the clay as the component A. A compatibilizer content of less than 1 wt % may not provide the rigidity and the gas barrier properties required for the lens barrel component because of insufficient affinity between the clay as the component A and the thermoplastic resin as the component B and insufficient dispersibility of the clay in the thermoplastic resin. On the other hand, a compatibilizer content of 200 wt % or more with respect to the clay may deteriorate kneadability in production of the composite material and moldability to the lens barrel component.

(9) The composite material used for molding the lens barrel component is allowed to contain a glass fiber or a carbon fiber as a component D. Conventionally used glass fiber and carbon fiber are used, and type of fiber is not particularly limited as long as the fibers are generally used for reinforcement of the resin. The fibers to be used may be selected from long fiber-type or short fiber-type chopped strands and milled fibers, for example. Further, particulate, not only fibrous, fibers may be used, and examples thereof include glass beads, glass flakes, and glass microballoons. The glass fiber or the carbon fiber may be used, or both thereof may be used in combination. The content of the glass fiber and the carbon fiber is preferably 1 to 40 wt %, preferably 5 to 30 wt %, more preferably 10 to 20 wt % with respect to the composite material. A content of 1 wt % or less results in small contribution of the glass fiber and the carbon fiber on improvement of the rigidity of the lens barrel component. On the other hand, a content of 40 wt % or more may inhibit the dispersibility of the clay in the thermoplastic resin, and thus, the effect of the present invention by the clay may be reduced drastically. Further, problems (non-filling of thin-walled portion, abrasion of metal mold) of the lens barrel component molded using the composite material containing the conventional glass fiber or carbon fiber may arise.

Figure 7:
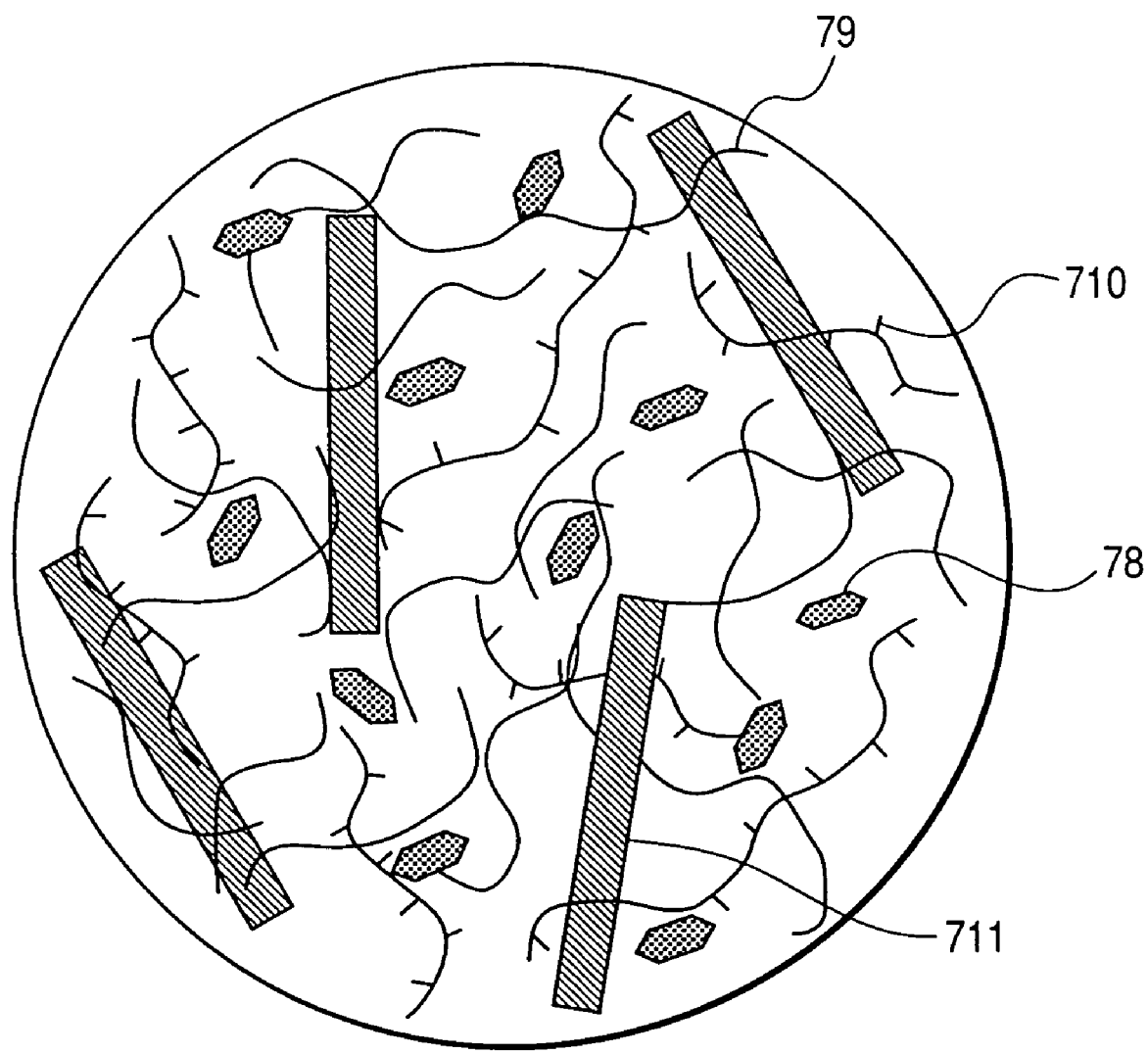
FIG. 7 is a structural diagram of a composite material molded into a lens barrel component according to examples of the present invention.

FIG. 7 shows a structure of the composite material used for molding the lens barrel component, containing components A, B, and D. In FIG. 7, the composite material contains a component A (clay) 78, a component B (polymer) 79, a functional group 710 introduced into the component B, and a component D (glass fiber or carbon fiber) 711.

(10) The composite material used for molding the lens barrel component can contain various additives without impairing the effect of the present invention. Specific examples of the additives include heat stabilizers, antioxidants, UV absorbers, photostabilizers, release agents, lubricants, slip modifiers, colorants, polymer crosslinking agents, heat resistant agents, fluorescent whiteners, light storing pigments, fluidity modifiers, nucleators, inorganic and organic antibacterial agents, photocatalyst-based stain-proofing agents, infrared absorbers, and photochromic agents.

(11) The lens barrel component is preferably molded through injection molding. The injection molding improves the productivity of the lens barrel composition.

(12) The average thickness of the lens barrel component is 1.0 mm or less. The average thickness had to be larger than 1.0 mm conventionally, but a lens barrel unit constructed by the lens barrel component of the components in the above item (1) (average thickness is 0.6 mm in FIG. 5, described below), thereby attaining miniaturization and weight saving.

(13) The composite material used for molding the lens barrel component is allowed to contain the clay with the organic onium ions as a component A and a aromatic polycarbonate resin as a component B. The aromatic polycarbonate resin loses its molecular weight through hydrolysis, and thus, the lens barrel component containing a hydrophilic inorganic substance such as clay may have reduced mechanical properties such as rigidity and impact strength. Thus, the clay containing the organic onium ions between the layers and subjected to hydrophobic treatment is preferably used as the component A, when an aromatic polycarbonate resin is used as the component B.

Hereinafter, the present invention will be described in more detail.

Figure 5:
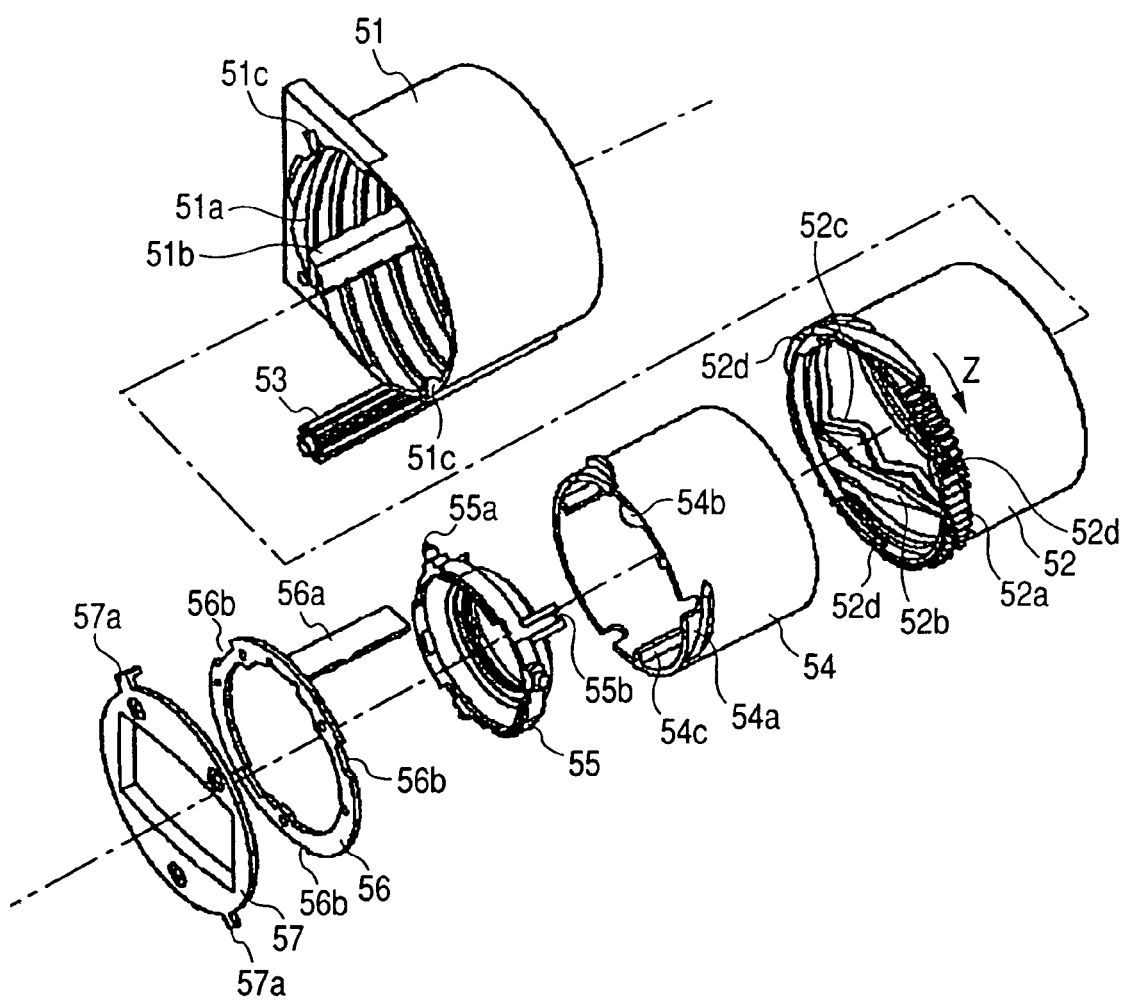
FIG. 5 is a perspective view showing a lens barrel component and a lens barrel unit according to examples of the present invention.

FIG. 5 describes an example of a lens barrel unit and a lens barrel component molded using a composite material containing the components A and B, the components A to C, or the components A to D.

FIG. 5 shows the construction of a differential-type two-unit zoom lens barrel. A stationary cylinder 51 accommodates the entire lens barrel unit; a female helicoid 51a formed on the stationary cylinder 51 is connected with a spur gear helicoid 52a of a cam cylinder 52, whereby the cam cylinder 52 is held so as to be capable of advancing and retreating in the optical axis direction with respect to the stationary cylinder 51 while rotating around the optical axis. Further, a drive gear 53 protruding from the stationary cylinder 51 is engaged with the spur gear portion of the spur gear helicoid 52a of the cam cylinder 52, whereby the cam cylinder 52 receives motive power inside the stationary cylinder 51 and is fed out in the optical axis direction while rotating. Retained inside a front unit cylinder 54 are a front unit lens, a shutter mechanism, etc. (not shown). A composite male helicoid 54a is formed on the front unit cylinder 54, and is connected with a composite female helicoid 52b of the cam cylinder 52. A rear unit cylinder 55 retains a rear unit lens (not shown). A cam pin 55a of the rear unit cylinder 55 is cam-connected with a cam groove 52c of the cam cylinder 52, and a straight-advancement groove 55b is key-connected with a straight-advancement key 54c of the front unit cylinder 54. A key portion 56a of a straight-advancement key ring 56 is key-connected with a straight-advancement groove 54b of the front unit cylinder 54. Further, a cutout portion 56b is combined with a protrusion 52d of the cam cylinder 52 in a certain rotational phase, and no detachment occurs in the phases other than that, thus constituting a bayonet mechanism. A straight-advancement guide 57 is placed at the rear of this straight-advancement key ring, which is mounted by a screw or the like, and a protruding key portion 57a is key-connected with the key groove 51c of the stationary cylinder 51.

In the lens barrel constructed as described above, the cam cylinder 52 rotates in the direction of the arrow Z to be fed out from the stationary cylinder 51, and, at the same time, the front unit cylinder 54 and the rear unit cylinder 55 are fed out inside the cam cylinder 52 so as to satisfy predetermined optical conditions (conditions for scaling operation and focusing operation), whereby photographing is possible with the camera equipped with this lens barrel. It is to be noted that the stationary cylinder 51 is mounted to the camera main body or formed integrally therewith.

Next, evaluation items and evaluation methods for the properties of the lens barrel component will be described.

(a) Injection Molding Maximum Filling Pressure

A lens barrel (outer diameter 30 mm×length 20 mm×thickness 0.6 mm) was molded through injection molding using a molding machine (SG50, screw diameter: Φ22, manufactured by Sumitomo Heavy Industries, Ltd.), and the maximum filling pressure during injection molding was measured. A small value represents low pressure required for filling, indicating good fluidity.

(b) Lens Barrel Rigidity

Figure 6:
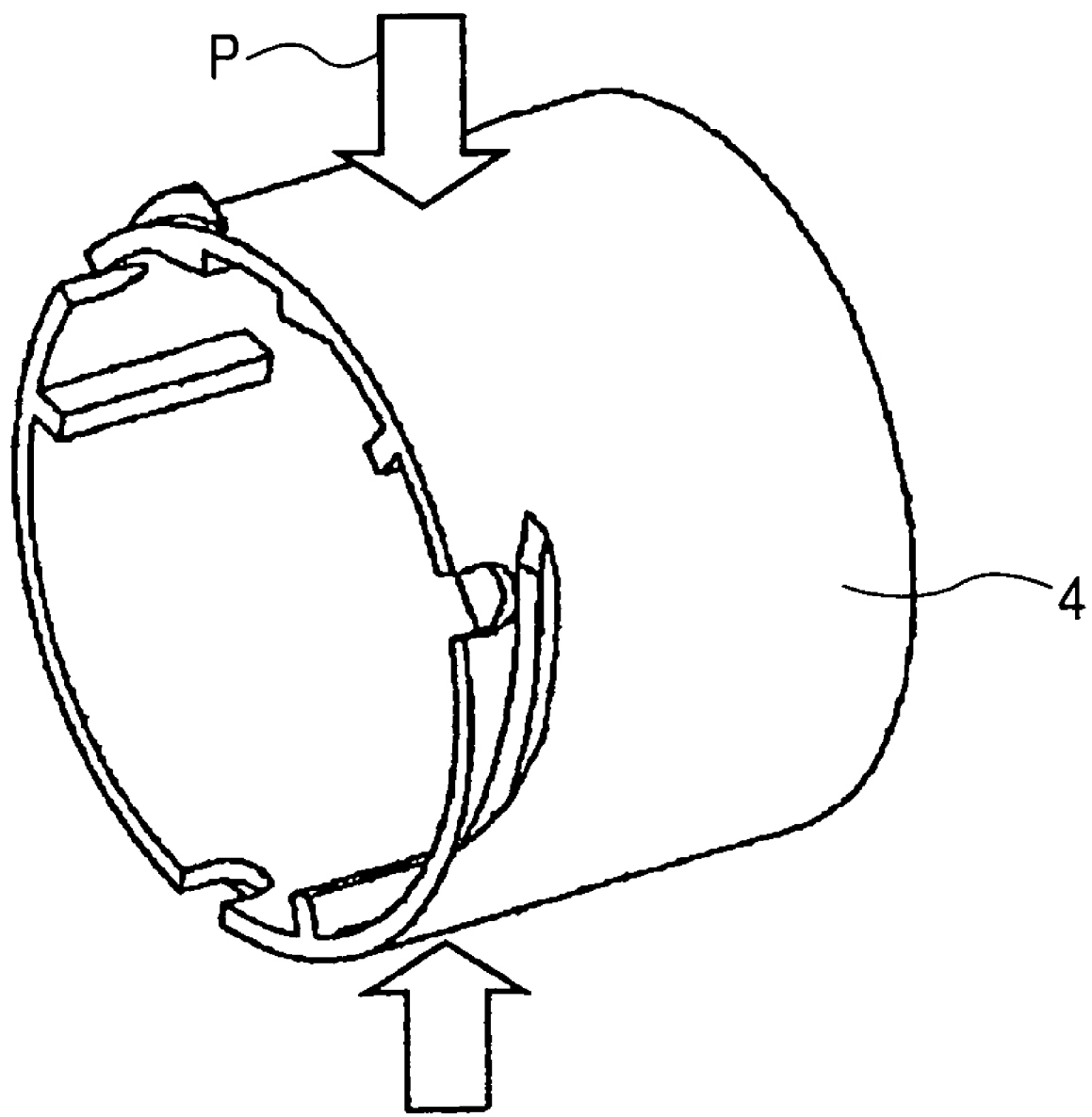
FIG. 6 is a perspective view illustrating an evaluation method for properties (rigidity) of a lens barrel component according to examples of the present invention.

In FIG. 6, the lens barrel (outer diameter 30 mm×length 20 mm×thickness 0.6 mm) was compressed in a direction of arrows P, and a load required for a displacement of 1 mm was defined as the lens barrel rigidity.

(c) Bending Modulus

A bending modulus was measured based on ASTM D790. Note that samples used each had a thickness of 4 mm. 5 samples were used, and the average value of the samples was determined.

(d) Circularity

A lens barrel (outer diameter 30 mm×length 20 mm×thickness 0.6 mm) was molded, and the circularity thereof was measured using a circularity instrument. The circularity was evaluated by a difference between the maximum radius and the minimum radius, and a small value indicates good circularity.

(e) Gas Barrier Properties (Nitrogen Gas Permeability Coefficient)

Molded products (thickness 0.6 mm) were produced from the composite materials constituting the lens barrel component, and the nitrogen gas permeability coefficients thereof were measured following ASTM D1434.

(f) Metal Mold Abrasion Loss

A part of a metal mold cavity was made of aluminum (A1050P) (in molded product of 25×25×1.5, region of aluminum die occupies 10×25). 10,000 shots were molded using the respective materials, and then weight change of the aluminum die was measured. A large value indicates large abrasion loss of the metal mold (crumbled amount).

EXAMPLE 11

5 wt % of montmorillonite (Kunipia F, available from Kunimine Industries Co., Ltd.) as a component A and 95 wt % of PC (polycarbonate resin L1225Y, available from Teijin Chemicals, Ltd.) as a component B were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 12

5 wt % of montmorillonite (Kunipia F, available from Kunimine Industries Co., Ltd.) as a component A and 95 wt % of PPS (polyphenylene sulfide resin FZ-2200-A5, available from Dainippon Ink and Chemicals, Inc.) as a component B were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 13

3 wt % of montmorillonite (Kunipia D, available from Kunimine Industries Co., Ltd.) organized with dimethyldistearylammonium ions as a component A and 97 wt % of PC (polycarbonate resin L1225Y, available from Teijin Chemicals, Ltd.) as a component B were melt kneaded using a twin screw extruder (ZE40A-40D, screw diameter: Φ40, L/D: 40, manufactured by Berstorff GmbH) at a cylinder temperature of 270° C. The extruded strands were cooled and then-pelletized using a pelletizer.

EXAMPLE 14

Example 13 was repeated except that the content of the montmorillonite (Kunipia D, available from Kunimine Industries Co., Ltd.) organized with dimethyldistearylammonium ions as the component A was changed to 20 wt % and the content of the PC (polycarbonate resin L1225Y, available from Teijin Chemicals, Ltd.) as the component B was changed to 80 wt %.

EXAMPLE 15

5 wt % of mica (ME/412, available from Co-op Chemical Co., Ltd.) organized with tri-n-butyl dodecyl phosphonium ions as a component A and 95 wt % of PPS (polyphenylene sulfide resin FZ-2200-A5, available from Dainippon Ink and Chemicals, Inc.) as a component B were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 16

5 wt % of montmorillonite (Kunipia D, available from Kunimine Industries Co., Ltd.) organized with dimethyldistearylammonium ions as a component A and 95 wt % of a carboxyl modified-PC resin as a component B prepared through a reaction of PC (polycarbonate resin L1225Y, available from Teijin Chemicals, Ltd.) and modified silicone oil (X-22-162C, available from Shin-Etsu Chemical Co., Ltd.) were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 17

5 wt % of montmorillonite (Kunipia D, available from Kunimine Industries Co., Ltd.) organized with dimethyldistearylammonium ions and treated with a silane coupling agent (KBM-903, as a component C, 1 wt % with respect to Kunipia D, available from Shin-Etsu Chemical Co., Ltd.) as a component A, and 95 wt % of a carboxyl modified-PC resin as a component B prepared through a reaction of PC (polycarbonate resin L1225Y, available from Teijin Chemicals, Ltd.) and modified silicone oil (X-22-162C, available from Shin-Etsu Chemical Co., Ltd.) were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 18

5 wt % of montmorillonite (Kunipia F, available from Kunimine Industries Co., Ltd.) treated with a water-soluble polymer containing an oxazoline group (EPOCROS RAS-1005, as a component C, 200 wt % with respect to Kunipia F, available from Nippon Shokubai Co., Ltd.) as a component A, and 95 wt % of PPS (polyphenylene sulfide resin FZ-2200-A5, available from Dainippon Ink and Chemicals, Inc.) as a component B were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 19

5 wt % of montmorillonite (Kunipia D, available from Kunimine Industries Co., Ltd.) organized with dimethyldistearylammonium ions and treated with a silane coupling agent (KBM-903, as a component C, 2 wt % with respect to Kunipia D, available from Shin-Etsu Chemical Co., Ltd.) as a component A, 85 wt % of a carboxyl modified-PC resin as a component B prepared through a reaction of PC (polycarbonate resin L1225Y, available from Teijin Chemicals, Ltd.) and modified silicone oil (X-22-162C, available from Shin-Etsu Chemical Co., Ltd.), and 10 wt % of glass fiber (available from Asahi Fiber Glass Co.) as a component D were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 110

10 wt % of mica (ME/412, available from Co-op Chemical Co., Ltd.) organized with tri-n-butyl dodecyl phosphonium ions and treated with a silane coupling agent (KBM-903, as a component C, 2 wt % with respect to ME/412, available from Shin-Etsu Chemical Co., Ltd.) as a component A, 60 wt % of PPS (polyphenylene sulfide resin FZ-2200-A5, available from Dainippon Ink and Chemicals, Inc.) as a component B, and 30 wt % of glass fiber (available from Asahi Fiber Glass Co.) as a component D were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 111

5 wt % of montmorillonite (Kunipia D, available from Kunimine Industries Co., Ltd.) organized with dimethyldistearylammonium ions and treated with a silane coupling agent (KBM-903, as a component C, 1 wt % with respect to Kunipia D, available from Shin-Etsu Chemical Co., Ltd.) as a component A, 90 wt % of a carboxyl modified-PC resin as a component B prepared through a reaction of PC (polycarbonate resin L1225Y, available from Teijin Chemicals, Ltd.) and modified silicone oil (X-22-162C, available from Shin-Etsu Chemical Co., Ltd.), and 5 wt % of carbon fiber (available from Toho Rayon Co., Ltd.) as a component D were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

COMPARATIVE EXAMPLE 11

Only component B was used, and 100 wt % of PC (polycarbonate resin L1225Y, available from Teijin Chemical Co., Ltd.) was used as the component B.

COMPARATIVE EXAMPLE 12

100 wt % of PC (polycarbonate resin G3130H, available from Teijin Chemical Co., Ltd.) containing 30 wt % of glass fiber of a component D was used as a component B.

COMPARATIVE EXAMPLE 13

100 wt % of PPS (polyphenylene sulfide resin FZ-2140, available from Dainippon Ink and Chemicals, Inc.) containing 40 wt % of glass fiber of a component D was used as a component B.

Comparative Example 14

100 wt % of PC (polycarbonate resin B7110R, available from Teijin Chemical Co., Ltd.) containing 10 wt % carbon fiber of a component D was used as a component B.

The pellets obtained in Examples 11, 13, 15, 16, 18, and 19, and Comparative Examples 11, 12, and 14 were dried at 120° C. for 4 or more hours. Molded products were produced through injection molding using an injection molding machine (SG50, screw diameter: Φ22, manufactured by Sumitomo Heavy Industries, Ltd.) at a cylinder temperature of 280° C. and a metal mold temperature of 130° C. Further, the pellets obtained in Examples 12, 14, and 17, and Comparative Example 13 were dried at 120° C. for 4 or more hours. Molded products were produced through injection molding using an injection molding machine (SG50, screw diameter: Φ22, manufactured by Sumitomo Heavy Industries, Ltd.) at a cylinder temperature of 305° C. and a metal mold temperature of 130° C.

The tests were conducted on the molded products, and Tables 2A to 2C collectively shows the results of the evaluation.

TABLE 2A

| | | | Examples | | | | | |
|---|---|---|---|---|---|---|---|---|
| | | | 11 | 12 | 13 | 14 | 15 | 16 |
| Lens barrel composition | Component B | Thermoplastic resin | PC | PPS | PC | PC | PPS | PC |
| | | Functional group introduced by modifier | — | — | — | — | — | Carboxyl group |

TABLE 2A-continued

|  |  |  | 11 | 12 | 13 | 14 | 15 | 16 |
|---|---|---|---|---|---|---|---|---|
|  |  | Thermoplastic resin mixing amount (wt %) | 95 | 95 | 95 | 80 | 95 | 95 |
|  | Component A | Clay | Montmorillonite | Montmorillonite | Montmorillonite | Montmorillonite | Mica | Montmorillonite |
|  |  | Onium ion | — | — | Dimethyl-distearyl-ammounium ion | Dimethyl-distearyl-ammounium ion | Tri-n-butyl dodecyl phosphonium ion | Dimethyl-distearyl-ammounium ion |
|  |  | Clay mixing amount (wt %) | 5 | 5 | 3 | 20 | 5 | 5 |
|  | Component C | Compatibilizer | — | — | — | — | — | — |
|  |  | Compatibilizer mixing amount (wt %)* | — | — | — | — | — | — |
|  | Component D | Glass fiber/carbon fiber | — | — | — | — | — | — |
|  |  | Glass fiber/carbon fiber mixing amount (wt %) | — | — | — | — | — | — |

|  |  |  |  | Examples | | | | |
|---|---|---|---|---|---|---|---|---|
|  |  |  |  | 17 | 18 | 19 | 110 | 111 |
| Lens barrel composition | | Component B | Thermoplastic resin | PC | PPS | PC | PPS | PC |
|  |  |  | Functional group introduced by modifier | Carboxyl group | — | Carboxyl group | — | Carboxyl group |
|  |  |  | Thermoplastic resin mixing amount (wt %) | 95 | 85 | 85 | 60 | 90 |
|  | | Component A | Clay | Montmorillonite | Montmorillonite | Montmorillonite | Mica | Montmorillonite |
|  |  |  | Onium ion | Dimethyl-distearyl-ammounium ion | — | Dimethyl-distearyl-ammounium ion | Tri-n-butyl dodecyl phosphonium ion | Dimethyl-distearyl-ammounium ion |
|  |  |  | Clay mixing amount (wt %) | 5 | 5 | 5 | 10 | 5 |
|  | | Component C | Compatibilizer | Silane coupling agent | Water-soluble polymer | Silane coupling agent | Silane coupling agent | Silane coupling agent |
|  |  |  | Compatibilizer mixing amount (wt %)* | 1 | 200 | 2 | 2 | 1 |
|  | | Component D | Glass fiber/carbon fiber | — | — | Glass fiber | Glass fiber | Carbon fiber |
|  |  |  | Glass fiber/carbon fiber mixing amount (wt %) | — | — | 10 | 30 | 5 |

TABLE 2B

|  |  | Examples | | | | | |
|---|---|---|---|---|---|---|---|
|  |  | 11 | 12 | 13 | 14 | 15 | 16 |
| Lens barrel properties | Maximum filling pressure during injection molding of lens barrel (MPa) | 130 | 125 | 120 | 125 | 115 | 120 |
|  | Lens barrel rigidity (N) | 4.1 | 4.4 | 4.4 | 5.5 | 5 | 4.6 |
|  | Bending modulus (MPa) | 2,430 | 3,030 | 3,050 | 4,450 | 4,010 | 3,200 |
|  | Circularity (μm) | 29 | 30 | 26 | 30 | 28 | 29 |

TABLE 2B-continued

|  |  | | | | | | |
|---|---|---|---|---|---|---|---|
| Nitrogen gas permeability coefficient ($cm^3 \cdot cm/cm^2 \cdot sec \cdot cmHg$) | | $8.01 \times 10^{-12}$ | $2.5 \times 10^{-11}$ | $6.52 \times 10^{-12}$ | $3.95 \times 10^{-12}$ | $1.2 \times 10^{-11}$ | $5.23 \times 10^{-12}$ |
| Metal mold abrasion loss (mg) | | 2 | 2.3 | 2 | 2.3 | 2.1 | 1.9 |

|  |  |  | Examples | | | | |
|---|---|---|---|---|---|---|---|
|  |  |  | 17 | 18 | 19 | 110 | 111 |
| Lens barrel properties | Maximum filling pressure during injection molding of lens barrel (MPa) | | 125 | 120 | 150 | 183 | 145 |
|  | Lens barrel rigidity (N) | | 4.9 | 5.2 | 6 | 8.6 | 6 |
|  | Bending modulus (MPa) | | 3,790 | 4,170 | 6,070 | 14,710 | 6,780 |
|  | Circularity (μm) | | 28 | 33 | 35 | 43 | 32 |
|  | Nitrogen gas permeability coefficient ($cm^3 \cdot cm/cm^2 \cdot sec \cdot cmHg$) | | $5.05 \times 10^{-12}$ | $1.9 \times 10^{-11}$ | $5.22 \times 10^{-12}$ | $1.1 \times 10^{-11}$ | $5.18 \times 10^{-12}$ |
|  | Metal mold abrasion loss (mg) | | 2.1 | 2.3 | 2.8 | 4.3 | 2.6 |

TABLE 2C

|  |  |  | Comparative Examples | | | |
|---|---|---|---|---|---|---|
|  |  |  | 11 | 12 | 13 | 14 |
| Lens barrel composition | Component B | Thermoplastic resin | PC | PC | PPS | PC |
|  |  | Functional group introduced by modifier | — | — | — | — |
|  |  | Thermoplastic resin mixing amount (wt %) | 100 | 70 | 60 | 90 |
|  | Component A | Clay | — | — | — | — |
|  |  | Onium ion | — | — | — | — |
|  |  | Clay mixing amount (wt %) | — | — | — | — |
|  | Component C | Compatibilizer | — | — | — | — |
|  |  | Compatibilizer mixing amount (wt %)* | — | — | — | — |
|  | Component D | Glass fiber/carbon fiber | — | Glass fiber | Glass fiber | Carbon fiber |
|  |  | Glass fiber/carbon fiber mixing amount (wt %) | — | 30 | 40 | 10 |
| Lens barrel properties | Maximum filling pressure during injection molding of lens barrel (MPa) | | 135 | 195 | 185 | 205 |
|  | Lens barrel rigidity (N) | | 3.8 | 6 | 7.8 | 6.1 |
|  | Bending modulus (MPa) | | 2,260 | 6,020 | 12,800 | 6,850 |
|  | Circularity (μm) | | 28 | 46 | 47 | 43 |
|  | Nitrogen gas permeability coefficient $cm^3 \cdot cm/cm^2 \cdot sec \cdot cmHg$ | | $8.55 \times 10^{-12}$ | $7.87 \times 10^{-12}$ | $2.6 \times 10^{-11}$ | $8.57 \times 10^{-12}$ |
|  | Metal mold abrasion loss (mg) | | 1.8 | 4.1 | 4.5 | 3.6 |

*Mixing amount with respect to component A (100%)

Tables 2A to 2C clearly shows that the lens barrel composed of the component A and the component B in Example 11 of the present invention has comparable moldability and dimension accuracy with that of Comparative Example 11 and has improved properties (rigidity and gas barrier properties) as a lens barrel. FIG. 6 is a diagram illustrating the evaluation method for the properties (rigidity) of the lens barrel component, and the lens barrel component in Example 11 more highly withstands the pressure P compared to the conventional component, for example.

Further, the lens barrels each molded using the composite material composed of the components A, B, C, and D in Examples 19 and 111 each have comparable rigidity with the conventional lens barrels in Comparative Examples 12 and 14 and each have significantly improved moldability (filling ability to thin-wall), circularity, and gas barrier properties.

The metal mold abrasion, which has been a conventional problem, can be reduced as well. The lens barrel containing PPS as the component B in Example 110 also has significantly improved lens barrel properties compared to those of the lens barrel in Comparative Example 13.

Third Embodiment

Hereinafter, the present invention will be described in more detail by way of Examples.

A lens barrel (diameter 30 mm×length 25 mm×average thickness 0.7 mm) was produced using the components of the present invention for the evaluation. The thickness limit of a lens barrel (lens barrel main body) was conventionally about 1.0 mm, but a lens barrel can be molded to a thickness of 0.7 mm by molding the lens barrel using a composite material containing a carbon nanotube and/or a vapor grown carbon fiber, and a layered clay mineral, as mentioned above. According to the present invention, a lens barrel having an average thickness of even 1.0 mm or less can be molded. Evaluation items and evaluation methods for the lens barrel will be described below.

3-1. Surface Resistivity

Surface resistivity as used herein refers to resistance per unit area of a sample surface and is an index for conductivity comparison of molded products. The surface resistivity can be measured using a 4-terminal 4-probe method following JIS-K7149 and a ring probe method following JIS-K6911. Measuring instruments used in the present invention include: a low resistivity meter (Loresta GP Model MCP-T600, measurement range: $10^{-3}$ to $10^7$ Ω, manufactured by Mitsubishi Chemical Corporation) and a high resistivity meter (Hiresta UP Model MCP-T450, measurement range: $10^6$ to $10^{13}$ Ω, manufactured by Mitsubishi Chemical Corporation). 10 samples were measured in this measurement, and the average value of the samples was defined as the surface resistivity.

3-2. Charge Potential

Charge potential as used herein refers to charge amount present on the sample surface, and directly indicates the antistatic properties of the sample. The measurement method involves: placing the lens barrel on a grounded stage; charging (0.1 μA×2 s=0.2 μC) the lens barrel through corona discharge; accumulating the charge on the surface of the lens barrel; and measuring the charge amount at 5 s after stopping the discharge using a surface potentiometer (Coronasurf, manufactured by TS Nanocoat). 10 samples were measured in this measurement, and the average value of the samples was defined as the charge potential. The measurement method is described in FIGS. 2A to 2D (254637).

3-3. Maximum Filling Pressure

Maximum filling pressure as used herein refers to the maximum pressure of the resin when the resin is filled in the cavity during injection molding, and is one component for evaluating resin fluidity. That is, the moldability of resin materials can be compared using the maximum filling pressure as a comparison item. A molding machine (SG50, screw diameter: Φ22, manufactured by Sumitomo Heavy Industries, Ltd.) was used.

3-4. Lens Barrel Rigidity

In FIGS. 2A to 2D, the lens barrel (outer diameter 30 mm×length 25 mm×thickness 0.7 mm) was compressed in a direction of arrows P, and a load required for a displacement of 1 mm was defined as the lens barrel rigidity.

3-5. Bending Modulus

A bending modulus was measured based on ASTM D790. Note that samples used each had a thickness of 4 mm. 5 samples were used, and the average value of the samples was determined.

3-6. Circularity

A lens barrel (outer diameter 30 mm×length 25 mm×thickness 0.7 mm) was molded, and the circularity thereof was measured using a circularity instrument. The circularity was evaluated by a difference between the maximum radius and the minimum radius, and a small value indicates good circularity.

3-7. Gas Barrier Properties (Nitrogen Gas Permeability Coefficient)

Molded products (thickness 0.7 mm) were produced from the composite materials constituting the lens barrel component, and the nitrogen gas permeability coefficients thereof were measured following ASTM D1434.

3-8. Metal Mold Abrasion Loss

A part of a metal mold cavity was made of aluminum (A1050P) (in molded product of 25×25×1.5, region of aluminum die occupies 10×25). 10,000 shots were molded using the respective materials, and then weight change of the aluminum die was measured. A large value indicates large abrasion loss of the metal mold (crumbled amount).

Types and notations of the respective components used in Examples of the present invention will be described below.

Component A

NT1: vapor grown multi-walled nanotube MWNT (average single fiber diameter=about 10 nm, available from Hyperion Catalysis International Inc.)

NT2: vapor grown multi-walled nanotube VGNF (average single fiber diameter=about 80 nm, available from Showa Denko K. K.)

NT3: vapor grown multi-walled nanotube VGCF (average single fiber diameter=about 150 nm, available from Showa Denko K. K.)

EXAMPLE 3-1

5 wt % of NT1 as a component A, 5 wt % of montmorillonite (Kunipia F, available from Kunimine Industries Co., Ltd.) as a component B, and 90 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-2

5 wt % of NT2 as a component A, 5 wt % of montmorillonite (Kunipia F, available from Kunimine Industries Co., Ltd.) as a component B, and 90 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-3

5 wt % of NT3 as a component A, 5 wt % of montmorillonite (Kunipia F, available from Kunimine Industries Co., Ltd.) as a component B, and 90 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-4

0.5 wt % of NT1 as a component A, 5 wt % of montmorillonite (Kunipia F, available from Kunimine Industries Co., Ltd.) as a component B, and 94.5 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-5

20 wt % of NT1 as a component A, 5 wt % of montmorillonite (Kunipia F, available from Kunimine Industries Co., Ltd.) as a component B, and 75 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-6

5 wt % of NT1 as a component A, 5 wt % of montmorillonite (Kunipia F, available from Kunimine Industries Co., Ltd.) as a component B, and 90 wt % of PPS (polyphenylene sulfide resin FZ-2200-A5, available from Dainippon Ink and Chemicals, Inc.) as a component C were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 3-7

5 wt % of NT1 as a component A, 3 wt % of montmorillonite (Kunipia D, available from Kunimine Industries Co., Ltd.) organized with dimethyldistearylammonium ions as a component B, and 92 wt % of PC (polycarbonate resin L1225Y, available from Teijin Chemicals, Ltd.) as a component C were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-8

Example 3-7 was repeated except that the content of the montmorillonite (Kunipia D, available from Kunimine Industries Co., Ltd.) organized with dimethyldistearylammonium ions as the component B was changed to 20 wt % and the content of the PC (polycarbonate resin L1225Y, available from Teijin Chemicals, Ltd.) as the component C was changed to 75 wt %.

EXAMPLE 3-9

5 wt % of NT1 as a component A, 5 wt % of mica (ME/412, available from Co-op Chemical Co., Ltd.) organized with tri-n-butyl dodecyl phosphonium ions as a component B, and 90 wt % of PPS (polyphenylene sulfide resin FZ-2200-A5, available from Dainippon Ink and Chemicals, Inc.) as a component C were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 3-10

5 wt % of NT1 as a component A, 5 wt % of montmorillonite (Kunipia D, available from Kunimine Industries Co., Ltd.) organized with dimethyldistearylammonium ions as a component B, and 90 wt % of a carboxyl modified-PC resin as a component C prepared through a reaction of PC (polycarbonate resin L1225Y, available from Teijin Chemicals, Ltd.) and modified silicone oil (X-22-162C, available from Shin-Etsu Chemical Co., Ltd.) were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-11

5 wt % of NT1 as a component A, 5 wt % of montmorillonite (Kunipia D, available from Kunimine Industries Co., Ltd.) organized with dimethyldistearylammonium ions and treated with a silane coupling agent (KBM-903, as a component D, 1 wt % with respect to Kunipia D, available from Shin-Etsu Chemical Co., Ltd.) as a component B, and 90 wt % of a carboxyl modified-PC resin as a component C prepared through a reaction of PC (polycarbonate resin L1225Y, available from Teijin Chemicals, Ltd.) and modified silicone oil (X-22-162C, available from Shin-Etsu Chemical Co., Ltd.) were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-12

5 wt % of NT1 as a component A, 5 wt % of montmorillonite (Kunipia F, available from Kunimine Industries Co., Ltd.) treated with a water-soluble polymer containing an oxazoline group (EPOCROS RAS-1005, as a component D, 200 wt % with respect to Kunipia F, available from Nippon Shokubai Co., Ltd.) as a component B, and 90 wt % of PPS (polyphenylene sulfide resin FZ-2200-A5, available from Dainippon Ink and Chemicals, Inc.) as a component C were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 3-13

5 wt % of NT1 as a component A, 5 wt % of montmorillonite (Kunipia D, available from Kunimine Industries Co., Ltd.) organized with dimethyldistearylammonium ions and treated with a silane coupling agent (KBM-903, as a component D, 2 wt % with respect to Kunipia D, available from Shin-Etsu Chemical Co., Ltd.) as a component B, 80 wt % of a carboxyl modified-PC resin as a component C prepared through a reaction of PC (polycarbonate resin L1225Y, available from Teijin Chemicals, Ltd.) and modified silicone oil (X-22-162C, available from Shin-Etsu Chemical Co., Ltd.), and 10 wt % of glass fiber (available from Asahi Fiber Glass Co.) as a component E were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

EXAMPLE 3-14

5 wt % of NT1 as a component A, 10 wt % of mica (ME/412, available from Co-op Chemical Co., Ltd.) organized with tri-n-butyl dodecyl phosphonium ions and treated with a silane coupling agent (KBM-903, as a component D, 2 wt % with respect to ME/412, available from Shin-Etsu Chemical Co., Ltd.) as a component B, 55 wt % of PPS (polyphenylene sulfide resin FZ-2200-A5, available from Dainippon Ink and Chemicals, Inc.) as a component C, and 30 wt % of glass fiber (available from Asahi Fiber Glass Co.) as a component E were melt kneaded using a twin screw extruder (ZE40A-40D, screw diameter: Φ40, L/D: 40, manufactured by Berstorff GmbH) at a cylinder temperature of 300° C. The extruded strands were cooled and then pelletized using a pelletizer.

EXAMPLE 3-15

5 wt % of NT1 as a component A, 5 wt % of montmorillonite (Kunipia D, available from Kunimine Industries Co., Ltd.) organized with dimethyldistearylammonium ions and treated with a silane coupling agent (KBM-903, as a component D, 1 wt % with respect to Kunipia D, available from Shin-Etsu Chemical Co., Ltd.) as a component B, 85 wt % of a carboxyl modified-PC resin as a component C prepared through a reaction of PC (polycarbonate resin L1225Y, available from Teijin Chemicals, Ltd.) and modified silicone oil (X-22-162C, available from Shin-Etsu Chemical Co., Ltd.), and 5 wt % of carbon fiber (available from Toho Rayon Co., Ltd.) as a component E were melt kneaded using a twin screw extruder (ZE40A-40D, screw diameter: Φ40, L/D: 40, manufactured by Berstorff GmbH) at a cylinder temperature of 270° C. The extruded strands were cooled and then pelletized using a pelletizer.

COMPARATIVE EXAMPLE 3-1

Only component C was used, and 100 wt % of PC (polycarbonate resin L1225Y, available from Teijin Chemical Co., Ltd.) was used as the component C.

COMPARATIVE EXAMPLE 3-2

100 wt % of PC (polycarbonate resin G3130H, available from Teijin Chemical Co., Ltd.) containing 30 wt % glass fiber of a component E was used as a component C.

COMPARATIVE EXAMPLE 3-3

100 wt % of PPS (polyphenylene sulfide resin FZ-2140, available from Dainippon Ink and Chemicals, Inc.) containing 40 wt % of glass fiber of a component E was used as a component C.

COMPARATIVE EXAMPLE 3-4

100 wt % of PC (polycarbonate resin B7110R, available from Teijin Chemical Co., Ltd.) containing 10 wt % carbon fiber of a component E was used as a component C.

The pellets obtained in Examples 3-1, 3-2, 3-3, 3-4, 3-5, 3-7, 3-8, 3-10, 3-11, 3-13, and 3-15, and Comparative Examples 3-1, 3-2, and 3-4 were dried at 120° C. for 4 or more hours. Molded products were produced through injection molding using an injection molding machine (SG50, screw diameter: Φ22, manufactured by Sumitomo Heavy Industries, Ltd.) at a cylinder temperature of 280° C. and a metal mold temperature of 130° C. Further, the pellets obtained in Examples 3-6, 3-9, 3-12, and 3-14, and Comparative Example 3-3 were dried at 120° C. for 4 or more hours. Molded products were produced through injection molding using an injection molding machine (SG50, screw diameter: Φ22, manufactured by Sumitomo Heavy Industries, Ltd.) at a cylinder temperature of 305° C. and a metal mold temperature of 130° C.

The tests were conducted on the molded products, and Tables 3 and 4 collectively show the results of the evaluation.

TABLE 3A

| | | | Examples | | | |
|---|---|---|---|---|---|---|
| | | | 3-1 | 3-2 | 3-3 | 3-4 |
| Lens barrel composition | Component A | Carbon nanotube | NT1 | NT2 | NT3 | NT1 |
| | | Carbon nanotube content (wt %) | 5 | 5 | 5 | 0.5 |
| | Component C | Thermoplastic resin | PC | PC | PC | PC |
| | | Functional group introduced by modifier | — | — | — | — |
| | | Thermoplastic resin mixing amount (wt %) | 90 | 90 | 90 | 94.5 |
| | Component B | Clay | Montmorillonite | Montmorillonite | Montmorillonite | Montmorillonite |
| | | Onium ion | — | — | — | — |
| | | Clay mixing amount (wt %) | 5 | 5 | 5 | 5 |
| | Component D | Compatibilizer | — | — | — | — |
| | | Compatibilizer mixing amount (wt %)* | | | | |

TABLE 3A-continued

|  |  |  |  |  |  |  |
|---|---|---|---|---|---|---|
|  | Component E | Glass fiber/carbon fiber | — | — | — | — |
|  |  | Glass fiber/carbon fiber mixing amount (wt %) | — | — | — | — |
| Lens barrel properties | Lens barrel surface resistivity (Ω/sq) |  | $7 \times 10^{4}$ | $2 \times 10^{8}$ | $2 \times 10^{9}$ | $7 \times 10^{11}$ |
|  | Charge potential (mV) |  | 259 | 780 | 895 | 1182 |
|  | Maximum filling pressure during injection molding of lens barrel (MPa) |  | 121 | 123 | 125 | 115 |
|  | Lens barrel rigidity (N) |  | 5.2 | 5.2 | 5.3 | 4.9 |
|  | Bending modulus (MPa) |  | 2510 | 2512 | 2525 | 2470 |
|  | Circularity (μm) |  | 22 | 22 | 23 | 21 |
|  | Nitrogen gas permeability coefficient ($cm^3 \cdot cm/cm^2 \cdot sec \cdot cmHg$) |  | $7.45 \times 10^{-12}$ | $7.58 \times 10^{-12}$ | $7.62 \times 10^{-12}$ | $7.95 \times 10^{-12}$ |
|  | Metal mold abrasion loss (mg) |  | 2 | 2 | 2.1 | 1.9 |

|  |  |  | Examples | | | |
|---|---|---|---|---|---|---|
|  |  |  | 3-5 | 3-6 | 3-7 | 3-8 |
| Lens barrel composition | Component A | Carbon nanotube | NT1 | NT1 | NT1 | NT1 |
|  |  | Carbon nanotube content (wt %) | 20 | 5 | 5 | 5 |
|  | Component C | Thermoplastic resin | PC | PPS | PC | PC |
|  |  | Functional group introduced by modifier | — | — | — | — |
|  |  | Thermoplastic resin mixing amount (wt %) | 75 | 90 | 92 | 75 |
|  | Component B | Clay | Montmorillonite | Montmorillonite | Montmorillonite | Montmorillonite |
|  |  | Onium ion | — | — | Dimethyl-distearyl-ammounium ion | Dimethyl-distearyl-ammounium ion |
|  |  | Clay mixing amount (wt %) | 5 | 5 | 3 | 20 |
|  | Component D | Compatibilizer | — | — | — | — |
|  |  | Compatibilizer mixing amount (wt %)* | — | — | — | — |
|  | Component E | Glass fiber/carbon fiber | — | — | — | — |
|  |  | Glass fiber/carbon fiber mixing amount (wt %) | — | — | — | — |
| Lens barrel properties | Lens barrel surface resistivity (Ω/sq) |  | $9 \times 10^{2}$ | $9 \times 10^{4}$ | $7 \times 10^{4}$ | $6 \times 10^{4}$ |
|  | Charge potential (mV) |  | 80 | 258 | 255 | 260 |
|  | Maximum filling pressure during injection molding of lens barrel (MPa) |  | 133 | 117 | 112 | 117 |
|  | Lens barrel rigidity (N) |  | 6 | 5.4 | 5.4 | 6.5 |
|  | Bending modulus (MPa) |  | 2650 | 3030 | 3050 | 4450 |
|  | Circularity (μm) |  | 24 | 23 | 19 | 23 |
|  | Nitrogen gas permeability coefficient ($cm^3 \cdot cm/cm^2 \cdot sec \cdot cmHg$) |  | $7.05 \times 10^{-12}$ | $2.45 \times 10^{-11}$ | $6.07 \times 10^{-12}$ | $3.50 \times 10^{-12}$ |
|  | Metal mold abrasion loss (mg) |  | 2.3 | 2.3 | 2 | 2.3 |

TABLE 3B

|  |  |  | Examples | | | |
|---|---|---|---|---|---|---|
|  |  |  | 3-9 | 3-10 | 3-11 | 3-12 |
| Lens barrel composition | Component A | Carbon nanotube | NT1 | NT1 | NT1 | NT1 |
|  |  | Carbon nanotube content (wt %) | 5 | 5 | 5 | 5 |
|  | Component C | Thermoplastic resin | PPS | PC | PC | PPS |
|  |  | Functional group introduced by modifier | — | Carboxyl group | Carboxyl group | — |
|  |  | Thermoplastic resin mixing amount (wt %) | 90 | 90 | 90 | 80 |
|  | Component B | Clay | Mica | Montmorillonite | Montmorillonite | Montmorillonite |
|  |  | Onium ion | Tri-n-butyl dodecyl phosphonium ion | Dimethyl-distearyl-ammounium ion | Dimethyl-distearyl-ammounium ion | — |
|  |  | Clay mixing amount (wt %) | 5 | 5 | 5 | 5 |

TABLE 3B-continued

|  |  |  |  |  |  |  |
|---|---|---|---|---|---|---|
|  | Component D | Compatibilizer | — | — | Silane coupling agent | Water-soluble polymer |
|  |  | Compatibilizer mixing amount (wt %)* | — | — | 1 | 200 |
|  | Component E | Glass fiber/carbon fiber | — | — | — | — |
|  |  | Glass fiber/carbon fiber mixing amount (wt %) | — | — | — | — |
| Lens barrel properties | Lens barrel surface resistivity (Ω/sq) |  | $7 \times 10^4$ | $7 \times 10^4$ | $6 \times 10^4$ | $6 \times 10^4$ |
|  | Charge potential (mV) |  | 258 | 256 | 251 | 263 |
|  | Maximum filling pressure during injection molding of lens barrel (MPa) |  | 107 | 112 | 117 | 112 |
|  | Lens barrel rigidity (N) |  | 6 | 5.6 | 5.9 | 6.2 |
|  | Bending modulus (MPa) |  | 4010 | 3200 | 3790 | 4170 |
|  | Circularity (μm) |  | 21 | 22 | 21 | 26 |
|  | Nitrogen gas permeability coefficient ($cm^3 \cdot cm/cm^2 \cdot sec \cdot cmHg$) |  | $1.15 \times 10^{-11}$ | $4.78 \times 10^{-12}$ | $4.60 \times 10^{-12}$ | $1.85 \times 10^{-11}$ |
|  | Metal mold abrasion loss (mg) |  | 2.1 | 1.9 | 2.1 | 2.31 |

|  |  |  |  | Examples |  |  |
|---|---|---|---|---|---|---|
|  |  |  |  | 3-13 | 3-14 | 3-15 |
| Lens barrel composition | Component A | Carbon nanotube |  | NT1 | NT1 | NT1 |
|  |  | Carbon nanotube content (wt %) |  | 5 | 5 | 5 |
|  | Component C | Thermoplastic resin |  | PC | PPS | PC |
|  |  | Functional group introduced by modifier |  | Carboxyl group | — | Carboxyl group |
|  |  | Thermoplastic resin mixing amount (wt %) |  | 80 | 55 | 85 |
|  | Component B | Clay |  | Montmorillonite | Mica | Montmorillonite |
|  |  | Onium ion |  | Dimethyl-distearyl-ammounium ion | Tri-n-butyl dodecyl phosphonium ion | Dimethyl-distearyl-ammounium ion |
|  |  | Clay mixing amount (wt %) |  | 5 | 10 | 5 |
|  | Component D | Compatibilizer |  | Silane coupling agent | Silane coupling agent | Silane coupling agent |
|  |  | Compatibilizer mixing amount (wt %)* |  | 2 | 2 | 1 |
|  | Component E | Glass fiber/carbon fiber |  | Glass fiber | Glass fiber | Carbon fiber |
|  |  | Glass fiber/carbon fiber mixing amount (wt %) |  | 10 | 30 | 5 |
| Lens barrel properties | Lens barrel surface resistivity (Ω/sq) |  |  | $8 \times 10^4$ | $8 \times 10^4$ | $1 \times 10^4$ |
|  | Charge potential (mV) |  |  | 272 | 275 | 203 |
|  | Maximum filling pressure during injection molding of lens barrel (MPa) |  |  | 131 | 138 | 132 |
|  | Lens barrel rigidity (N) |  |  | 7 | 9.6 | 7 |
|  | Bending modulus (MPa) |  |  | 6070 | 14170 | 6790 |
|  | Circularity (μm) |  |  | 28 | 36 | 25 |
|  | Nitrogen gas permeability coefficient ($cm^3 \cdot cm/cm^2 \cdot sec \cdot cmHg$) |  |  | $4.77 \times 10^{-12}$ | $1.05 \times 10^{-11}$ | $4.70 \times 10^{-12}$ |
|  | Metal mold abrasion loss (mg) |  |  | 2.8 | 4.3 | 2.6 |

TABLE 4

|  |  |  | Comparative Examples |  |  |  |
|---|---|---|---|---|---|---|
|  |  |  | 3-1 | 3-2 | 3-3 | 3-4 |
| Lens barrel composition | Component A | Carbon nanotube | — | — | — | — |
|  |  | Carbon nanotube content (wt %) | — | — | — | — |
|  | Component C | Thermoplastic resin | PC | PC | PPS | PC |
|  |  | Functional group | — | — | — | — |

TABLE 4-continued

|  |  |  | Comparative Examples | | | |
|---|---|---|---|---|---|---|
|  |  |  | 3-1 | 3-2 | 3-3 | 3-4 |
|  |  | introduced by modifier |  |  |  |  |
|  |  | Thermoplastic resin mixing amount (wt %) | 100 | 70 | 60 | 90 |
|  | Component B | Clay | — | — | — | — |
|  |  | Onium ion | — | — | — | — |
|  |  | Clay mixing amount (wt %) | — | — | — | — |
|  | Component D | Compatibilizer | — | — | — | — |
|  |  | Compatibilizer mixing amount (wt %)* | — | — | — | — |
|  | Component E | Glass fiber/carbon fiber | — | Glass fiber | Glass fiber | Carbon fiber |
|  |  | Glass fiber/carbon fiber mixing amount (wt %) | — | 30 | 40 | 10 |
| Lens barrel properties | Lens barrel surface resistivity (Ω/sq) |  | >$10^{16}$ | >$10^{16}$ | >$10^{16}$ | $7 \times 10^3$ |
|  | Charge potential (mV) |  | not measurable | not measurable | not measurable | not measurable |
|  | Maximum filling pressure during injection molding of lens barrel (MPa) |  | 138 | 190 | 180 | 200 |
|  | Lens barrel rigidity (N) |  | 3.8 | 6 | 7.8 | 6.1 |
|  | Bending modulus (MPa) |  | 2260 | 6020 | 12900 | 6850 |
|  | Circularity (μm) |  | 21 | 39 | 40 | 43 |
|  | Nitrogen gas permeability coefficient ($cm^3 \cdot cm/cm^2 \cdot sec \cdot cmHg$) |  | $8.55 \times 10^{-12}$ | $7.87 \times 10^{-12}$ | $2.6 \times 10^{-11}$ | $8.57 \times 10^{-12}$ |
|  | Metal mold abrasion loss (mg) |  | 1.8 | 4.1 | 4.5 | 3.6 |

What is claimed is:

1. A lens barrel molded using a conductive resin composition comprising at least the following components (A) and (B), wherein
    component (A) is a carbon nanotube; and
    component (B) is a resin, and wherein
    the components (A) and (B) are contained within the following ranges with respect to 100 wt % of the conductive resin composition:
        component (A) is from 0.5 wt % to 20 wt %; and
        component (B) is the balance.

2. A lens barrel according to claim 1, wherein the component (A) has an average single fiber diameter within a range of 1 to 200 nm.

3. A lens barrel according to claim 1, wherein the lens barrel has a surface resistivity of $1 \times 10^0$ Ω/sq or more and $1 \times 10^{13}$ Ω/sq or less.

4. A lens barrel according to claim 1, wherein the component (B) is at least one resin selected from the group consisting of a polycarbonate (PC) resin, a polyphenylene sulfide (PPS) resin, an acrylonitrile butadiene styrene (ABS) resin, a polybutylene terephthalate (PBT) resin, a polyethylene terephthalate (PET) resin, a polystyrene (PS) resin, a polyphenylene ether (PPE) resin, a polyamide (PA) resin, a liquid crystal polymer (LCP) resin, a polyolefin resin, and an alloy resin comprising two or more resins mentioned above in combination such as PC/ABS or PC/PS.

5. A lens barrel according to claim 1, wherein the lens barrel is formed through injection molding.

6. A lens barrel according to claim 1, wherein the conductive resin composition further comprises, as a component (C), at least one selected from the group consisting of a glass fiber, a carbon fiber, a pitch-based carbon fiber, a PAN-based carbon fiber, silicone, silicone oil, and silane.

* * * * *